(12) United States Patent
Fujimoto et al.

(10) Patent No.: US 12,476,921 B2
(45) Date of Patent: Nov. 18, 2025

(54) SERVER DELAY CONTROL DEVICE, SERVER DELAY CONTROL METHOD, AND PROGRAM

(71) Applicant: NTT, Inc., Tokyo (JP)

(72) Inventors: Kei Fujimoto, Musashino (JP); Masashi Kaneko, Musashino (JP)

(73) Assignee: NTT, Inc., Tokyo (JP)

( * ) Notice: Subject to any disclaimer, the term of this patent is extended or adjusted under 35 U.S.C. 154(b) by 315 days.

(21) Appl. No.: 18/264,991

(22) PCT Filed: Feb. 10, 2021

(86) PCT No.: PCT/JP2021/005002
§ 371 (c)(1),
(2) Date: Aug. 10, 2023

(87) PCT Pub. No.: WO2022/172366
PCT Pub. Date: Aug. 18, 2022

(65) Prior Publication Data
US 2024/0129255 A1 Apr. 18, 2024

(51) Int. Cl.
*H04L 47/56* (2022.01)
*H04L 43/103* (2022.01)

(52) U.S. Cl.
CPC .......... *H04L 47/568* (2013.01); *H04L 43/103* (2013.01)

(58) Field of Classification Search
CPC ..... H04L 47/568; H04L 43/103; H04L 41/22; G06F 9/54
See application file for complete search history.

(56) References Cited

U.S. PATENT DOCUMENTS

2005/0055399 A1* 3/2005 Savchuk ............. H04L 63/1416
709/230
2015/0049769 A1* 2/2015 Tamir ..................... H04L 47/56
370/412

(Continued)

FOREIGN PATENT DOCUMENTS

| JP | 2015197874 | 11/2015 |
| JP | 2018032156 | 3/2018 |

OTHER PUBLICATIONS

Git.dpdk.org [online], "Soft Patch Panel—DPDK resources management framework," Jul. 2016, retrieved on Jul. 18, 2023, retrieved from URL <http://dpdk.org/browse/apps/spp/>, 229 pages.

(Continued)

*Primary Examiner* — Austin J Moreau
(74) *Attorney, Agent, or Firm* — Fish & Richardson P.C.

(57) ABSTRACT

Provided is a server delay control device for a server in which an OS having a kernel is deployed. The OS includes: a ring buffer managed by the kernel; and a poll list in which information on a net device of a hardware interrupt from an NIC is registered. The server delay control device is deployed in the server and configured to receive a timer interrupt at predetermined specified intervals and monitors a packet arrival and includes: a packet arrival monitoring part configured to check the presence or absence of a packet in the poll list upon being triggered by the timer interrupt to monitor the poll list; and a packet dequeuer configured to, when a packet has arrived, reference the packet held in the ring buffer, and perform dequeuing to remove the corresponding queue entry from the ring buffer.

14 Claims, 12 Drawing Sheets

(56) References Cited

U.S. PATENT DOCUMENTS

2021/0209047 A1\* 7/2021 Kim .................... G06F 13/1647
2022/0019362 A1\* 1/2022 Badiger ................. G06F 12/10

OTHER PUBLICATIONS

LWN.net [online], "New API," Feb. 2002, retrieved on Jul. 18, 2023, retrieved from URL <http://lwn.net/2002/0321/a/napi-howto.php3>, 10 pages.

\* cited by examiner

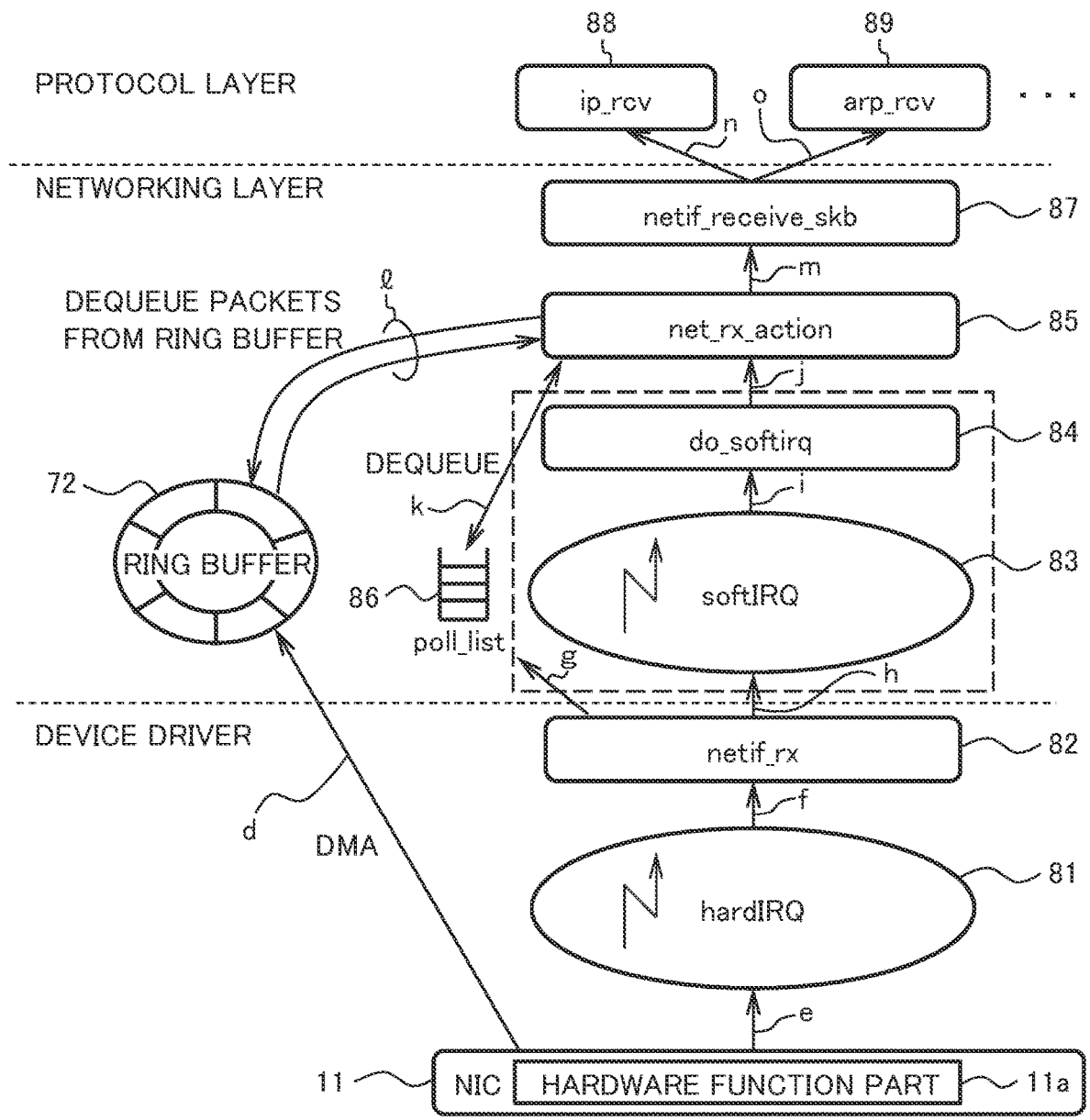

SERVER DELAY CONTROL DEVICE, SERVER DELAY CONTROL METHOD, AND PROGRAM

CROSS-REFERENCE TO RELATED APPLICATIONS

This is a National Stage Application of PCT Application No. PCT/JP2021/005002, filed on Feb. 10, 2021. The disclosure of the prior application is considered part of the disclosure of this application, and is incorporated in its entirety into this application.

BACKGROUND

Technical Field

The present invention relates to a server delay control device, a server delay control method, and a program.

Background Art

Against the background of advances in virtualization technology achieved through NFV (Network Functions Virtualization), systems are being constructed and operated on a per-service basis. Also, a mode called SFC (Service Function Chaining) is becoming mainstream, in which, based on the above-described mode of constructing a system on a per-service basis, service functions are divided into units of reusable modules and are operated on independent virtual machine (VM: Virtual Machine, container, etc.) environments, and thereby the service functions are used as needed in a manner as if they are components, and the operability is improved.

A hypervisor environment consisting of Linux (registered trademark) and a KVM (kernel-based virtual machine) is known as a technology for forming a virtual machine. In this environment, a Host OS (an OS installed on a physical server is called a "Host OS") in which a KVM module is incorporated operates as a hypervisor in a memory area called kernel space, which is different from user spaces. In this environment, the virtual machine operates in a user space, and a Guest OS (an OS installed on a virtual machine is called a Guest OS) operates in the virtual machine.

Unlike the physical server in which the Host OS operates, in the virtual machine in which the Guest OS operates, all hardware including network devices (such as Ethernet card devices) is controlled via registers, which is needed for interrupt processing from the HW (hardware) to the Guest OS and for writing from the Guest OS to the hardware. In such register-based control, the performance is generally lower than that in the Host OS environment because the notifications and processing that would have been executed by physical hardware are emulated virtually by software.

To deal with this degraded performance, there is a technique of reducing HW emulation from a Guest OS, in particular, for a Host OS and an external process present outside of the virtual machine of the Guest OS, to improve performance and versatility of communication using a high-speed and consistent interface. As such a technique, a device abstraction technique called virtio, that is, a para-virtualization technique, has been developed and already been applied to many general-purpose OSes, such as FreeBSD (registered trade name) as well as Linux (registered trade name) and currently put into practical use.

In virtio, regarding data input/output such as console input/output, file input/output, and network communication, as a unidirectional data transfer transport, data exchange and queue operations using a queue designed with a ring buffer are defined. By using the virtio queue specifications and preparing queues whose number and sizes are suitable for each device when the Guest OS starts up, communication between the Guest OS and the outside of its virtual machine can be realized merely through operations on the queues without performing hardware emulation.

Packet Transfer in Interrupt Model (Example of General-Purpose VM Configuration)

PTL 1 describes a virtual communication channel construction system in which a Guest OS operating in a virtual machine constructs a dedicated virtual communication channel for communication with an external process that exists outside the virtual machine. The technique described in PTL 1 speeds up packet transfer processing by reducing the number of virtio-net related memory copy operations between the Host OS and the Guest OS connected by virtio.

FIG. 9 is an explanatory diagram illustrating packet transfer operations performed according to the interrupt model in a server virtualization environment which is configured with a general-purpose Linux kernel (registered trademark) and a VM.

HW 10 includes a network interface card (NIC) 11 (a physical NIC) (an interface part), and performs communication for data transmission and reception with a packet processing APL (Application) 1 in a user space 60 via a virtual communication channel constructed by a Host OS 20, a KVM 30, which is a hypervisor that constructs virtual machines, virtual machines (VM 1, VM 2) 40, and a Guest OS 50. In the following description, as indicated by the thick arrows in FIG. 9, the data flow in which packet processing APL 1 receives a packet from HW 10 is referred to as "Rx-side reception", and the data flow in which packet processing APL 1 transmits a packet to HW 10 is called "Tx-side transmission".

Host OS 20 includes a kernel 21, a Ring Buffer 22, and a Driver 23. Kernel 21 includes a vhost-net module 221, which is a kernel thread, a TAP device 222, and a virtual switch (br) 223.

TAP device 222 is a kernel device of a virtual network and is supported by software. Virtual machine (VM 1) 40 is configured such that Guest OS 50 and Host OS 20 can communicate via virtual switch (br) 223 created in a virtual bridge. TAP device 222 is a device connected to a Guest OS 50's virtual NIC (vNIC) created in this virtual bridge.

Host OS 20 copies the configuration information (sizes of shared buffer queues, number of queues, identifiers, information on start addresses for accessing the ring buffers, etc.) constructed in the virtual machine of Guest OS 50 to vhost-net module 221, and constructs, inside Host OS 20, information on the endpoint on the virtual machine side. This vhost-net module 221 is a kernel-level back end for virtio networking, and can reduce virtualization overhead by moving virtio packet processing tasks from the user area (user space) to vhost-net module 221 of kernel 21.

Guest OSes 50 include a Guest OS (Guest 1) installed on the virtual machine (VM 1) and a Guest OS (Guest 2) installed on the virtual machine (VM 2), and Guest OSes 50 (Guest 1, Guest 2) operate in virtual machines (VM 1, VM 2) 40. Taking Guest 1 as an example of Guest OSes 50, Guest OS 50 (Guest 1) includes a kernel 51, a Ring Buffer 52, and a Driver 53, and Driver 53 includes a virtio-driver 531.

Specifically, as PCI (Peripheral Component Interconnect) devices, there are respective virtio devices for console input/output, file input/output, and network communication in the virtual machine (the device for the console, which is called virtio-console, the device for file input/output, which is called virtio-blk, and the device for the network, which is called virtio-net, and their corresponding drivers included in the OS are each defined with a virtio queue). When Guest OS starts up, two data transfer endpoints (transmission/reception endpoints) for each device are created between Guest OS and the counterpart side, and a parent-child relationship for data transmission and reception is constructed. In many cases, the parent-child relationship is formed between the virtual machine side (child side) and the Guest OS (parent side).

The child side exists as configuration information of each device in the virtual machine, and requests the size of each data area, the number of combinations of needed endpoints, and the type of the device to the parent side. In accordance with the request from the child side, the parent side allocates and maintains memory for a shared buffer queue for accumulating and transferring the needed amount of data, and sends the address of the memory as a response to the child side so that the child side can access it. Operations of the shared buffer queue necessary for data transfer are uniformly defined in virtio, and are performed in a state where both the parent side and the child side have agreed on the definition. Furthermore, the size of the shared buffer queue also has been agreed on by both sides (i.e., it is determined for each device). As a result, it is possible to operate the queue shared by both the parent side and the child side by merely communicating the address to the child side.

As each shared buffer queue prepared in virtio is prepared for one direction, for example, a virtual network device called a virtio-net device is constituted by three Ring Buffers 52 for transmission, reception, and control. Communication between the parent and the child is realized by writing to the shared buffer queue and performing a buffer update notification. That is, after writing to the Ring Buffer 52, a notification is made to the counterpart. Upon receipt of the notification, the counterpart side uses common operations of virtio to check which shared buffer queue contains the new data and check how much the new data is, and retrieves a new buffer area. As a result, transfer of data from the parent to the child or from the child to the parent is achieved.

As described above, by sharing Ring Buffer 52 for mutual data exchange and the operation method (used in common in virtio) for each ring buffer between the parent and the child, communication between Guest OS 50 and the outside, which does not require hardware emulation, is realized. This makes it possible to realize transmission and reception of data between Guest OS 50 and the outside at a high speed compared to the conventional hardware emulations.

If Guest OS 50 in the virtual machine communicates with the outside, the child side needs to connect to the outside and transmit and receive data as a relay between the outside and the parent side. For example, communication between Guest OS 50 and Host OS 20 is one example. Here, if the outside is Host OS 20, two patterns are present as existing communication methods.

In the first method (hereinafter referred to as "external communication method 1"), a child-side endpoint is constructed in the virtual machine, and a communication between Guest OS 50 and Host OS 20 is connected in the virtual machine to a communication endpoint (usually called a "TAP/TUN device") provided by Host OS 20. This connection constructs a connection as follows and thus realizes communication from Guest OS 50 to Host OS 20.

In this case, Guest OS 50 operates in a memory area that is a user space having privileges different from a memory area called kernel space, in which the TAP driver and Host OS 20 operate. For this reason, at least one memory copy occurs in the communication from Guest OS 50 to Host OS 20.

In the second method (hereinafter referred to as "external communication method 2"), a technology called vhost-net exists as means for solving this. According to the vhost-net, parent-side configuration information (sizes of shared buffer queues, number of queues, identifiers, information on start addresses for accessing ring buffers, etc.) once constructed in the virtual machine is copied into the vhost-net module 221 inside the Host OS 20, and information on the endpoints of the child side is constructed inside the host. Vhost-net is a technology that enables operations on shared buffer queues to be carried out directly between Guest OS 50 and Host OS 20 by this construction. As a result, the number of copy operations is substantially zero, and data transfer can be realized at a higher speed than the external communication method 1 because the number of copy operations is less by one compared to virtio-net.

In this manner, in the case of Host OS 20 and Guest OS 50 connected by virtio, packet transfer processing can be sped up by reducing the number of virtio-net related memory copy operations.

Note that in kernel v4.10 (February 2017-) and later, the specifications of the TAP interface have changed, and packets inserted from the TAP device are completed in the same context as the processing of copying packets to the TAP device. Accordingly, software interrupts (softIRQ) no longer occur.

Packet Transfer in Polling Model (Example of DPDK)

The method of connecting and coordinating virtual machines is called Inter-VM Communication, and in large-scale environments such as data centers, virtual switches have been typically used in connections between VMs. However, since it is a method with a large communication delay, faster methods have been newly proposed. For example, a method of using special hardware called SR-IOV (Single Root I/O Virtualization), a method performed with software using Intel DPDK (Intel Data Plane Development Kit) (hereinafter referred to as DPDK), which is a high-speed packet processing library, and the like have been proposed (see NPL 1).

DPDK is a framework for controlling an NIC (Network Interface Card), which was conventionally controlled by a Linux kernel (registered trademark), in a user space. The biggest difference from the processing in the Linux kernel is that it has a polling-based reception mechanism called PMD (Pull Mode Driver). Normally, with a Linux kernel, an interrupt occurs upon arrival of data on the NIC, and this interrupt triggers the execution of reception processing. On the other hand, in a PMD, a dedicated thread continuously checks arrival of data and performs reception processing. High-speed packet processing can be performed by eliminating the overhead of context switching, interrupts, and the like. DPDK significantly increases packet processing performance and throughput, making it possible to ensure more time for processing of data plane applications.

DPDK exclusively uses computer resources such as a CPU (Central Processing Unit) and an NIC. For this reason, it is difficult to apply it to an application, such as SFC, that flexibly reconnects in units of modules. There is SPP (Soft Patch Panel), which is an application for mitigating this. SPP omits packet copy operations in the virtualization layer by adopting a configuration in which shared memory is prepared between VMs and each VM can directly reference the same memory space. Also, DPDK is used to speed up exchanging packets between a physical NIC and the shared memory. In SPP, the input destination and output destination of a packet can be changed by software by controlling the reference destination for the memory exchange by each VM. Through this process, SPP realizes dynamic connection switching between VMs, and between a VM and a physical NIC.

PTL 2 describes a virtual machine connection control system that causes a plurality of virtual machines to operate. PTL2 describes a server delay control system including: an SPP server having an SPP (Soft Patch Panel) that manages resources including the virtual machines; and a GUI terminal that, in cooperation with the SPP server, performs, through GUI (Graphical User Interface) operations, resource allocation and route setting for connecting the virtual machines. The technology described in PTL 2 provides a virtual machine connection control system that abstracts the operations of the SPP and allows operations of the SPP to be performed intuitively through a GUI.

FIG. 10 is an explanatory diagram illustrating packet transfer performed based on a polling model in an OvS-DPDK (Open vSwitch with DPDK) configuration. The same components as those in FIG. 9 are denoted by the same reference signs thereas, and descriptions of overlapping portions are omitted.

As illustrated in FIG. 10, a Host OS 20 includes an OvS-DPDK 70, which is software for packet processing; and OvS-DPDK 70 includes a vhost-user 71, which is a functional part for connecting to a virtual machine (here, VM 1), and a dpdk (PMD) 72, which is a functional part for connecting to an NIC (DPDK) 11 (physical NIC).

Moreover, a packet processing APL 1A includes a dpdk (PMD) 2, which is a functional part that performs polling in the Guest OS 50 section. That is, packet processing APL 1A is an APL obtained by modifying packet processing APL 1 illustrated in FIG. 9 by equipping packet processing APL 1 with dpdk (PMD) 2.

As an extension of DPDK, packet transfer performed based on the polling model enables a routing operation using a GUI in an SPP that rapidly performs packet copy operations between Host OS 20 and Guest OS 50 and between Guest OSes 50 via shared memory with zero-copy operation.

Rx-Side Packet Processing by New API (NAPI)

FIG. 11 is a schematic diagram of Rx-side packet processing by New API (NAPI) implemented in Linux kernel 2.5/2.6 and later versions (see NPL 2). The same components as those in FIG. 9 are denoted by the same reference signs thereas.

As illustrated in FIG. 11, New API (NAPI) executes, on a server including an OS 70 (e.g., a Host OS), a packet processing APL 1 deployed in a user space 60, which can be used by a user, and performs packet transfer between an NIC 11 of HW 10, connected to the OS 70, and packet processing APL 1.

OS 70 has a kernel 71, a ring buffer 72, and a driver 73, and kernel 71 has a protocol processor 74.

Kernel 71 has the function of the core part of OS 70 (e.g., Host OS). Kernel 71 monitors hardware and manages execution status of programs, on a per-process basis. Here, kernel 71 responds to requests from packet processing APL 1 and conveys requests from HW 10 to packet processing APL 1. In response to a request from packet processing APL 1, kernel 71 performs processing via a system call (a "user program operating in a non-privileged mode" requests processing to a "kernel operating in a privileged mode").

Kernel 71 transmits packets to packet processing APL 1 via a Socket 75. Kernel 71 receives packets from packet processing APL 1 via Socket 75.

Ring buffer 72 is managed by kernel 71 and is in the memory space in the server. Ring buffer 72 is a constant-sized buffer that stores messages output by kernel 71 as logs, and is overwritten from the beginning when the messages exceed a maximum size.

Driver 73 is a device driver for monitoring hardware in kernel 71. Incidentally, driver 73 depends on kernel 71, and is replaced if the source code of the created (built) kernel is modified. In this case, a corresponding driver source code is to be obtained and rebuilding is to be performed on the OS that will use the driver, to create the driver.

Protocol processor 74 performs protocol processing of L2 (data link layer)/L3 (network layer)/L4 (transport layer), which are defined by the OSI (Open Systems Interconnection) reference model.

Socket 75 is an interface for kernel 71 to perform inter-process communication. Socket 75 has a socket buffer and does not frequently generate data copy processing. The flow up to the establishment of communication via Socket 75 is as follows. 1. The server side creates a socket file according to which the server side accepts clients. 2. Name the acceptance socket file. 3. Create a socket queue. 4. Accept a first connection from a client that is in the socket queue. 5. The client side creates a socket file. 6. The client side sends a connection request to the server. 7. The server side creates a connection socket file separately from the acceptance socket file. As a result of establishing communication, packet processing APL 1 becomes able to call a system call, such as read( ) and write( ), to kernel 71.

In the above configuration, kernel 71 receives a notification of a packet arrival from NIC 11 via a hardware interrupt (hardIRQ) and schedules a software interrupt (softIRQ) for packet processing (see FIG. 12).

Above-described New API (NAPI), implemented in Linux kernel 2.5/2.6 and later versions, processes, upon arrival of a packet, the packet by a software interrupt (softIRQ) after the hardware interrupt (hardIRQ). As illustrated in FIG. 11, in packet transfer based on the interrupt model, a packet is transferred through interrupt processing (see reference sign c in FIG. 11), and therefore a wait due to the interrupt processing occurs and the delay in packet transfer increases.

An Overview of Rx-Side Packet Processing of NAPI Will be Described Below. Configuration of Rx-Side Packet Processing by New API (NAPI)

FIG. 12 is an explanatory diagram for explaining an overview of Rx-side packet processing by New API (NAPI) at the part surrounded by the dashed line in FIG. 11.

Device Driver

As illustrated in FIG. 12, components deployed in the device driver include; NIC 11, which is a network interface card (physical NIC); hardIRQ 81, which is a handler called due to the generation of a processing request from NIC 11 to perform the requested processing (hardware interrupt); and netif_rx 82, which is a processing function part for the hardware interrupt.

Networking Layer

The components deployed in the networking layer include: softIRQ 83, which is a handler called due to the generation of a processing request from netif_rx 82 to perform the requested processing (software interrupt); and do_softirq 84, which is a control function part that performs the actual part of the software interrupt (softIRQ). The components deployed in the networking layer further include: net_rx_action 85, which is a packet processing function part that is executed upon reception of the software interrupt (softIRQ); a poll list 86, in which information on a net device (net_device), indicative of which device the hardware interrupt from NIC 11 comes from, is registered; netif_receive_skb 87, which creates a sk_buff structure (structure for enabling the kernel 71 to know the structure of the packet); and a ring buffer 72.

Protocol Layer

The components deployed in the protocol layer include: ip_rcv 88, arp_rcv 89, and the like, which are packet processing function parts.

The above-described netif_rx 82, do_softirq 84, net_rx_action 85, netif_receive_skb 87, ip_rcv 88, and arp_rcv 89 are program components (function names) used for packet processing in kernel 71.

Rx-Side Packet Processing Operation by New API (NAPI)

The arrows (reference signs) d to o in FIG. 12 indicate the flow of the Rx-side packet processing.

A hardware function part 11*a* of NIC 11 (hereinafter referred to as "NIC 11") is configured to, upon reception of a packet in a frame (or upon reception of a frame) from a remote device, copy the arrived packet to ring buffer 72 by a Direct Memory Access (DMA) transfer (see reference sign d in FIG. 12), without using the CPU. Ring buffer 72 is managed by kernel 71 in a memory space in the server (see FIG. 11).

However, kernel 71 cannot notice the arrived packet simply by NIC 11 copying the arrived packet to ring buffer 72. When the packet arrives, NIC 11 raises a hardware interrupt (hardIRQ) to hardIRQ 81 (see reference sign e in FIG. 12) and netif_rx 82 performs the processing described below, which causes kernel 71 to notice the packet. Incidentally, the notation of an ellipse surrounding hardIRQ 81, illustrated in FIG. 12, represents a handler rather than a functional part.

netif_rx 82 has a function of performing actual processing. When hardIRQ 81 (handler) has started execution (see reference sign f in FIG. 12), netif_rx 82 stores, into poll list 86, information on a net device (net_device), which is one piece of information of the content of the hardware interrupt (hardIRQ) and which indicates which device the hardware interrupt from NIC 11 comes from, and registers, in poll list 86, a dequeuing operation (referencing the content of a packet pooled in a buffer and, processing to be performed on the packet, taking into account the processing to be performed next, removing the corresponding queue entry from the buffer) (see reference sign g in FIG. 12). Specifically, netif_rx 82, in response to the packet having been loaded into ring buffer 72, registers a dequeuing operation in poll list 86 using a driver of NIC 11. As a result, information on the dequeuing operation due to the packet having been loaded into ring buffer 72 is registered into poll_list 86.

In this way, in the device driver illustrated in FIG. 12, upon reception of a packet, NIC 11 copies the arrived packet to ring buffer 72 by a DMA transfer. In addition, NIC 11 raises hardIRQ 81 (handler), and netif_rx 82 registers net_device in poll_list 86 and schedules a software interrupt (softIRQ).

With the above-described processing, the hardware interrupt processing in device driver illustrated in FIG. 12 ends.

netif_rx 82 passes up, to softIRQ 83 (handler) via a software interrupt (softIRQ) (see reference sign h in FIG. 12), a request for dequeuing data stored in ring buffer 72 using information (specifically, a pointer) enqueued in the queue stacked in poll list 86, thereby to communicate the request to notify do_softirq 84, which is a software interrupt control function part (see reference sign i in FIG. 12).

do_softirq 84 is a software interrupt control function part that defines functions of the software interrupt (there are various types of packet processing; the interrupt processing is one of them; it defines the interrupt processing). Based on the definition, do_softirq 84 notifies net_rx_action 85, which performs actual software interrupt processing, of a request for processing the current (corresponding) software interrupt (see reference sign j in FIG. 12).

When the order of the softIRQ comes, net_rx_action 85 calls, according to net_device registered in poll_list 86 (see reference sign k in FIG. 12), a polling routine configured to dequeue a packet from ring buffer 72, to dequeue the packet (see reference sign l in FIG. 12). At this time, net_rx_action 85 continues the dequeuing until poll list 86 becomes empty.

Thereafter, net_rx_action 85 notifies netif_receive_skb 87 (see reference sign m in FIG. 12).

netif_receive_skb 87 creates a sk_buff structure, analyzes the content of the packet, and assigns processing to the protocol processor 74 arranged in the subsequent stage (see FIG. 11) in a manner depending on the type. That is, netif_receive_skb 87 analyzes the content of the packet and, when processing is to be performed according to the content of the packet, assigns (see reference sign n in FIG. 12) the processing to ip_rcv 88 of the protocol layer, and, for example, in the case of L2, assigns processing to arp_rcv 89 (see reference sign o in FIG. 12).

CITATION LIST

Patent Literature

PTL 1: Japanese Patent Application Laid-open No. 2015-197874 A
PTL 2: Japanese Patent Application Laid-open No. 2018-32156 A Non Patent Literature NPL 1: Soft Patch Panel, [online], [retrieved on Feb. 4, 2021], Internet <URL: http://dpdk.org/browse/apps/spp/>
NPL 2: New API (NAPI), [online], [retrieved on Feb. 4, 2021], Internet <URL: http://http://lwn.net/2002/0321/a/napi-howto.php3>

SUMMARY OF THE INVENTION

Technical Problem

However, the packet transfer based on the interrupt model and the packet transfer based on the polling model have the following problems.

In the interrupt model, the kernel that receives an event (hardware interrupt) from the HW performs packet transfer through software interrupt processing for performing packet processing. As the interrupt model transfers packets through an interrupt (software interrupt) processing, there is a problem in that when a contention with other interrupts occurs and/or when the interrupt destination CPU is in use by a process with a higher priority, a wait occurs, and thus the delay in packet transfer increases. In this case, if the interrupt processing is congested, the wait delay further increases.

For example, as illustrated in FIG. 9, in packet transfer based on the interrupt model, a packet is transferred through interrupt processing (see reference signs a and b in FIG. 9), and therefore a wait due to the interrupt processing occurs and the delay in packet transfer increases.

A supplemental description will be given of the mechanism by which a delay occurs in the interrupt model.

In a general kernel, in packet transfer processing, packet transfer processing is performed in software interrupt processing after hardware interrupt processing.

When a software interrupt for packet transfer processing occurs, the software interrupt processing cannot be executed immediately under the conditions (1) to (3) described below. Thus, a wait in the order of milliseconds occurs due to the interrupt processing being mediated and scheduled by a scheduler such as ksoftirqd (a kernel thread for each CPU; executed when the load of the software interrupt becomes high).

(1) When there is a contention with other hardware interrupt processing
(2) When there is a contention with other software interrupt processing
(3) When the interrupt destination CPU is in use by another process or a kernel thread (migration thread, etc.), which has a higher priority.

Under the above conditions, the software interrupt processing cannot be executed immediately.

In addition, a NW delay in the order of milliseconds also occurs in the same manner in the packet processing by New API (NAPI) due to a contention with an interrupt processing (softIRQ), as indicated in the dashed box p in FIG. 12.

On the other hand, the polling model performs polling on a communication queue while occupying the CPU, and dequeues packets immediately at the time of their arrivals. Although the polling model can reduce the transfer delay, it is necessary to equip the APL with a polling function, and therefore the APL needs to be modified.

For example, as illustrated in FIG. 10, in packet transfer based on the polling model, it is necessary to equip packet processing APL 1 with dpdk (PMD) 2, which is a functional part for performing polling, in the Guest OS 50 section. Thus, it is necessary to modify the packet processing APL 1.

The present invention has been made in view of such a background, and an object of the present invention is to achieve low-delay packet processing and to perform packet transfer with a reduced delay in a server without modifying an APL.

Means for Solving the Problem

To solve the above-described problem, the present invention is a server delay control device. An OS includes: a kernel; a ring buffer managed by the kernel, in a memory space in which a server deploys the OS; and a poll list in which information on a net device is registered, the information on the net device being indicative of which device a hardware interrupt from an interface part comes from. The kernel includes the server delay control device, which is configured to receive a timer interrupt at predetermined specified intervals and spawn a thread configured to monitor a packet arrival according to a polling model. The server delay control device includes: a packet arrival monitoring part configured to configure the timer interrupt as a hardware interrupt and check the presence or absence of a packet in the poll list upon being triggered by the timer interrupt to monitor the poll list; and a packet dequeuer configured to, when a packet has arrived, reference the packet held in the ring buffer, and perform, on the basis of the processing to be performed next, dequeuing to remove a corresponding queue entry from the ring buffer.

Advantageous Effects of the Invention

According to the present invention, low-delay packet processing can be achieved and packet transfer can be performed with a reduced delay in a server without modifying an APL.

BRIEF DESCRIPTION OF DRAWINGS

FIG. 12 is an explanatory diagram illustrating an outline of Rx-side packet processing by New API (NAPI) at the part surrounded by the dashed line in FIG. 11.

DESCRIPTION OF EMBODIMENTS

Hereinafter, a server delay control system and the like in a mode for carrying out the present invention (hereinafter, referred to as "the present embodiment") will be described with reference to the drawings.

First Embodiment

Figure 1:
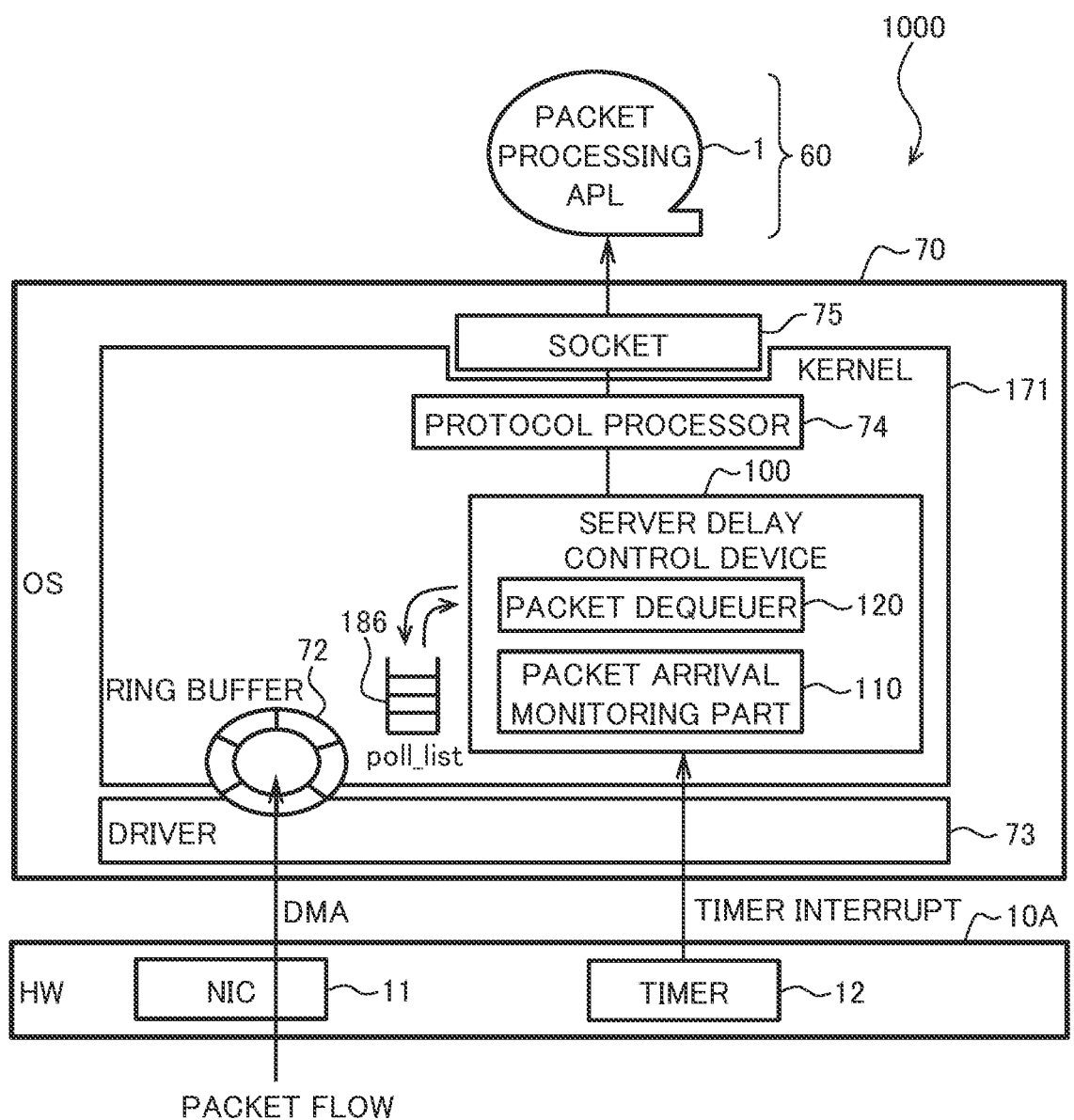
FIG. 1 is a schematic configuration diagram of a server delay control system according to a first embodiment of the present invention.
Figure 11:
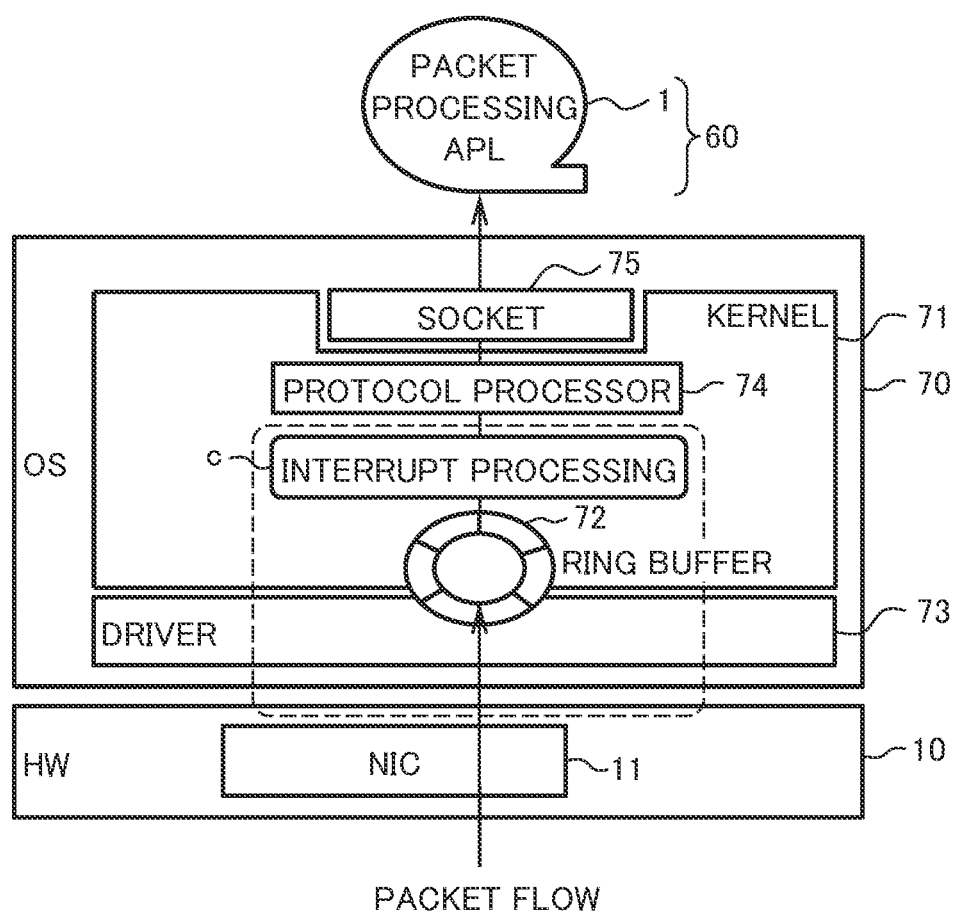
FIG. 11 is a schematic diagram of Rx-side packet processing by New API (NAPI) implemented in Linux kernel 2.5/2.6 and later versions.

Overview
FIG. 1 is a schematic configuration diagram of a server delay control system according to a first embodiment of the present invention. The present embodiment is an example applied to Rx-side packet processing by New API (NAPI) implemented in Linux kernel 2.5/2.6 and later versions. The same components as those in FIGS. 11 and 12 are denoted by the same reference signs thereas.

As illustrated in FIG. 1, the server delay control system 1000 executes, on a server including an OS 70 (e.g., a host OS), a packet processing APL 1 deployed in a user space 60 usable by a user and performs packet transfer between an NIC 11 of a HW 10A connected to the OS 70 and the packet processing APL 1.

<HW 10A>

HW 10A has NIC 11 (physical NIC) (interface part) and a timer 12.

Timer 12 generates timer interrupts in the form of a hardware interrupt at predetermined timer intervals. Timer 12 generates timer interrupts for which processing is able to be performed within a specified interval. For example, there is a mechanism called hrtimers in the kernel, and this hrtimers may be used.

<OS 70>

OS 70 has a kernel 171, a ring buffer 72, and a driver 73. Kernel 171 has a server delay control device 100, a poll list 186, and a protocol processor 74.

In the present embodiment, kernel 171 is given a new reference numeral to be distinguished from kernel 71 illustrated in FIG. 11, because the former includes server delay control device 100. Kernel 171 has the same function as kernel 71 illustrated in FIG. 11 (see FIG. 11), except that server delay control device 100 is installed in kernel 171. Note that kernel 171 may be embodied without reconstructing (newly building) existing kernel 71 (see FIG. 11), by using Livepatch (described below).

Kernel 171 has the function of the core portion of OS 70 (e.g., a Host OS) and monitors hardware and manages program execution status, on a per-process basis. Here, kernel 171 responds to requests from packet processing APL 1 and communicates requests from HW 10A to packet processing APL 1. Kernel 171 processes requests from packet processing APL 1 via system calls.

Kernel 171 transmits packets to packet processing APL 1 via a socket 75. Kernel 71 receives packets from packet processing APL 1 via socket 75.

Kernel 171 manages the ring buffer 72, in a memory space in the server. Ring buffer 72 is a constant-sized buffer that stores messages output by kernel 171 as logs, and is overwritten from the beginning when the messages exceed a maximum size.

Driver 73 is a device driver for monitoring hardware in kernel 171.

poll_list 186 stores information on net device (net_device), which is one of the pieces of information in the content of the hardware interrupt (hardIRQ), indicative of which device the hardware interrupt from NIC 11 comes from.

Protocol processor 74 performs protocol processing of L2/L3/L4 defined by the OSI reference model.

Socket 75 is an interface for kernel 171 to perform inter-process communication. Socket 75 has a socket buffer and does not frequently cause a data copying process.

Server Delay Control Device

Server delay control device 100 receives a timer interrupt at predetermined specified intervals, and, upon being triggered by the timer interrupt (hardware interrupt), checks the arrival of packets in the context of the hardware interrupt, and performs packet dequeueing processing at the arrivals of the packets.

Server delay control device 100 includes a packet arrival monitoring part 110 and a packet dequeuer 120.

Packet arrival monitoring part 110 is a thread for monitoring whether a packet has arrived.

Packet arrival monitoring part 110 configures the timer interrupt as a hardware interrupt and, upon being triggered by the timer interrupt, checks the presence or absence of a packet in the poll_list 186 (see FIG. 2) to monitor (poll) the poll list 186.

Packet arrival monitoring part 110 retrieves, from poll list 186, pointer information indicative of the presence of a packet present in ring buffer 72 (see FIG. 2) and NET_DEVICE information, and communicates the information (pointer information and net_device information) to packet dequeuer 120. When multiple pieces of packet information are present in poll_list 186, packet arrival monitoring part 110 communicates the multiple pieces of information to packet dequeuer 120.

When a packet has arrived, packet dequeuer 120 references the packet held in ring buffer 72, and performs, on the basis of the processing to be performed next, dequeuing to remove the corresponding queue entry from ring buffer 72 (hereinafter, description regarding the dequeuing is sometimes abbreviated as "dequeuing the packet from ring buffer 72" and the like). Packet dequeuer 120 retrieves the packet from ring buffer 72 on the basis of the communicated information and transmits the packet to netif_receive_skb 87 (see FIG. 2).

During a period set in advance by a maintenance operator, packet dequeuer 120 retrieves packets from ring buffer 72 based on the received information and communicates the packets to netif_receive_skb 87.

Figure 2:
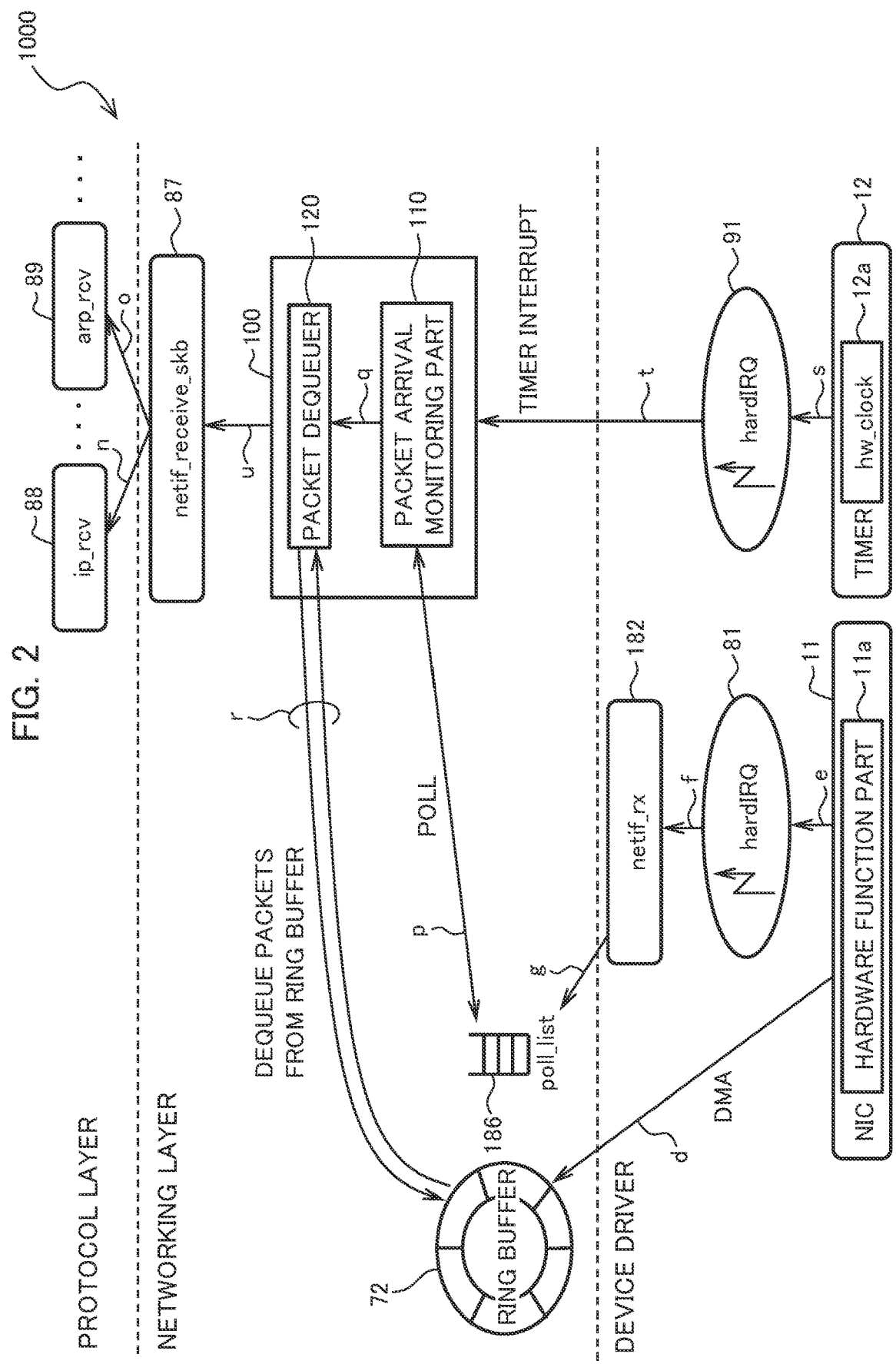
FIG. 2 is an explanatory diagram illustrating an outline of packet processing of the server delay control system according to the first embodiment of the present invention.

FIG. 2 is an explanatory diagram illustrating details of Rx-side packet processing by New API (NAPI) of server delay control system 1000 in FIG. 1. The same components as those in FIGS. 1 and 12 are denoted by the same reference signs thereas.

Device Driver

As illustrated in FIG. 2, the components deployed in the device driver include; NIC 11, which is a network interface card; hardIRQ 81, which is a handler called due to the generation of a processing request from NIC 11 to perform the requested processing (hardware interrupt); and netif_rx 182, which is a processing function part for the hardware interrupt.

In addition, the components deployed in the device driver include: an hw_clock 12a that constitutes timer 12; and a hardIRQ 91, which is a handler called due to the generation of hw_clock 12a to perform the requested processing (hardware interrupt).

Networking Layer

The components deployed in the networking layer include: poll list 186, in which information on a net device (net_device), indicative of which device the hardware interrupt from NIC 11 comes from, is registered; server delay control device 100; netif_receive_skb 87, which creates a sk_buff structure for socket communication in which no interrupt occurs, the dequeued packet, wherein sk_buff is a structure for kernel 171 to indicate the state of a packet; and ring buffer 72.

Protocol Layer

The components deployed in the protocol layer include: ip_rcv 88, arp_rcv 89, and the like, which are packet processing function parts. Note that, protocol processing other than ip_rcv 88 and arp_rcv 89 is present.

The above-described netif_rx 182, netif_receive_skb 87, ip_rcv 88, and arp_rcv 89 are program components (function names) called in kernel 171 for packet processing.

Hereinbelow, a description will be given of an operation of server delay control system 1000.

Summary of Packet Processing According to Present Invention

The arrows (reference signs) d to g and p to u in FIG. 2 indicate the flow of the Rx-side packet processing.

Server delay control system 1000 has a hardware interrupt triggered by NIC 11 and a hardware interrupt triggered by a timer interrupt. These will be described in order below.

Trigger by NIC 11

When NIC 11 receives a packet (or a frame) in the frame from the remote device, NIC 11 copies the arrived packet to ring buffer 72 by a Direct Memory Access (DMA) transfer without intervention of the CPU (see reference sign d in FIG. 2). This ring buffer 72 is managed in a memory space in the server by kernel 171 (see FIG. 1).

NIC 11 generates a hardware interrupt to register, in poll_list 186, NIC driver information and pointer information on the data stored in Ring Buffer 72. At this time, registration of software interrupt (NEX_RX_SOFTIRQ) is not performed. With this, the software interrupt function of the packet transfer processing is halted.

When a packet has arrived, NIC 11 raises a hardware interrupt (hardIRQ) to hardIRQ 81 (interrupt handler) (see reference sign e in FIG. 2) and netif_rx 182 performs the processing described below, which causes kernel 171 to notice the packet.

When hardIRQ 81 (handler) has started execution (see reference sign f in FIG. 2), netif_rx 182 stores, into poll_list 186, information of a net device (net_device), which is one piece of information of the content of the hardware interrupt (hardIRQ) and which indicates which device the hardware interrupt from NIC 11 comes from, and registers (see reference sign g in FIG. 2) dequeuing operation information in poll list 186. Specifically, in response to the packet having been loaded into ring buffer 72, netif_rx 182 registers, in poll_list 186, a dequeuing operation to be performed subsequently, using a driver of NIC 11. As a result, information on the dequeuing operation due to the packet having been loaded into ring buffer 72 is registered into poll_list 186.

Although netif_rx 182 registers net_device in poll list 186, it does not perform scheduling of a software interrupt (softIRQ), unlike netif_rx 82 illustrated in FIG. 12. That is, netif_rx 182 differs from netif_rx 82 in FIG. 12 in that netif_rx 182 does not perform scheduling of a software interrupt (softIRQ).

With the above-described processing, the hardware interrupt processing triggered by NIC 11 in Device Driver illustrated in FIG. 2 ends.

In the present embodiment, in the networking layer illustrated in FIG. 12, softIRQ 83 and do_softirq 84 are eliminated, and accordingly, netif_rx 82, illustrated in FIG. 12, does not perform communication to raise softIRQ 83 (handler) (see reference sign h in FIG. 12).

In the present embodiment, softIRQ 83 and do_softirq 84, illustrated in FIG. 12, are eliminated in server delay control system 1000, and instead, server delay control device 100 is deployed, in the server, in the memory space of the networking layer, illustrated in FIG. 2.

In the networking layer illustrated in FIG. 2, packet arrival monitoring part 110 of server delay control device 100 monitors (polls) poll list 186 (see reference sign p in FIG. 2) to check whether a packet has arrived.

Packet arrival monitoring part 110 retrieves pointer information indicative of the presence of a packet in ring buffer 72 and net_device information from poll_list 186 and communicates the information (pointer information and net_device information) to packet dequeuer 120 (see reference sign q in FIG. 2). Here, if multiple pieces of packet information are present in the poll list 186, information as many as the multiple pieces is communicated.

When a packet has arrived, packet dequeuer 120 of server delay control device 100 dequeues the packet from ring buffer 72 (see reference sign r in FIG. 2).

Packet dequeuer 120 retrieves the packet from ring buffer 72 according to the communicated information and communicates the packet to netif_receive_skb 87 (see reference sign u in FIG. 2).

Trigger by Timer Interrupt

Timer 12 (normally integrated in a CPU), which is a clock device, clocks a specified time duration by using hw_clock 12a, and raises a hardware interrupt (hardIRQ) to hardIRQ 91 (handler) (see reference sign s in FIG. 2). This specified time is a time interval specified in advance by an operator. When the specified time elapses, a timer interrupt (hardware interrupt) is generated (see reference sign t in FIG. 2). The operator specifies an interval (e.g., 1 µs) suitable for the packet processing as the specified time. Server delay control device 100 receives the timer interrupt with the specified interval caused by timer 12 to obtain right to execute in the form of a hardware interrupt.

The specified interval is a time interval such that the packet processing by the hardware interrupt does not occupy a CPU time required for the system operation and does not occupy a predetermined time duration (set by an operator; e.g., 1 µs) or more.

Note that the kernel (registered trademark) includes an existing mechanism called hrtimers with respect to the timer.

In the hardware interrupt of the timer interrupt, packet arrival monitoring part 110 checks (polls) whether a pointer of a packet has been stored in poll_list 186 (see reference sign p in FIG. 2). When a pointer of the packet has been stored in poll_list 186, the pointer information and the device driver information are communicated to packet dequeuer 120.

Here, the hardware interrupt is processing with extremely high priority, and when the hardware interrupt is generated, the CPU cannot execute other processing. In this embodiment, the hardware interrupt is executed at certain intervals by means of a timer interrupt. This makes it possible to avoid the hardware interrupt occupying the CPU and thus causing the system to become unstable.

In addition, if a hardware interrupt is generated every time a packet arrives at NIC 11 and processing is performed in the hardware interrupt context, the system cannot use the CPU and an unstable operation will be resulted. The present embodiment does not raise a hardware interrupt such as to be raised every time a packet arrives at the NIC 11 and causes the timer interrupt to execute a hardware interrupt, thereby to avoid the system from becoming unstable.

Packet dequeuer 120 dequeues a packet from ring buffer 72 based on the received pointer information and the device driver information. That is, upon being triggered by a timer interrupt, packet dequeuer 120 checks the presence or absence of a packet(s) in poll list 186, and when a packet(s) have arrived, dequeues the packet(s) from the ring buffer 72. Thereafter, packet dequeuer 120 communicates the data to netif_receive_skb 87.

In this way, in the device driver, server delay control system 1000 halts softIRQ of the packet processing, which is a main cause of the occurrence of the NW delay, and, upon being triggered by the timer, performs packet processing in the context of hardIRQ having high priority, thereby avoiding softIRQ contentions. When packet processing by hardIRQ having high priority occupies CPU time, the system operation becomes unstable. Server delay control device 100, upon being triggered by the timer, operates in short time slices, thereby to secure a CPU time required for system operation and avoid the above-described packet processing by hardIRQ from occupying the CPU time and thus avoid the system operation from becoming unstable. This achieves a stable operation.

Context Processing of Hardware Interrupt netif_receive_skb 87 creates an sk_buff structure from the received data. Thereafter, the processing continues to the protocol processing by kernel 171 (see FIG. 1). Specifically, kernel 171 analyzes the content of the packet and assigns processing to the protocol processor 74 arranged in the subsequent stage (see FIG. 11) in a manner depending on the type. That is, netif_receive_skb 87 analyzes the content of the packet and, in the case when processing is to be performed according to the content of the packet, assigns the processing to ip_rcv 88 of the protocol layer, and, for example, in the case of L2, assigns processing to arp_rcv 89.

Registration Operation Using Livepatch

Next, a description will be given of a registration operation using Livepatch.

In server delay control system 1000 (see FIG. 1), kernel 171 of OS 70, illustrated in FIG. 1, includes server delay control device 100. Kernel 171 can be embodied without reconstructing (newly building) existing kernel 71 (see FIG. 11), by using Livepatch. Hereinbelow, a description will be given of Livepatch applied to kernel 171.

Livepatch is a kernel patch function to be applied to Linux (registered trade name) kernel. Using Livepatch, it is possible to instantly apply modification to the kernel space without rebooting the system. Specifically, (1) Livepatch suppresses the softIRQ scheduling function of netif_rx 182 (see FIG. 2).

(2) Livepatch starts a thread that monitors packet arrivals (packet arrival monitoring part 110, specifically, isol_net_rx). When the thread (packet arrival monitoring part 110) is started, the thread occupies the CPU core so that the busy polling (see reference sign p in FIG. 2) is not interfered by other processes or kernel threads. To do so, the thread is assigned a high priority setting, such as one for a real-time process. According to the number of traffic flows (or traffic amount), the thread is started on multiple CPU cores and assigned a poll_list 186 to be monitored (see FIG. 2). This allows scaling-out according to the traffic flow (traffic amount).

Thereafter, the operation of the packet processing illustrated in FIG. 2 is performed.

Rx-Side Packet Processing Operation Flow of Server Delay Control Device 100

Figure 3:
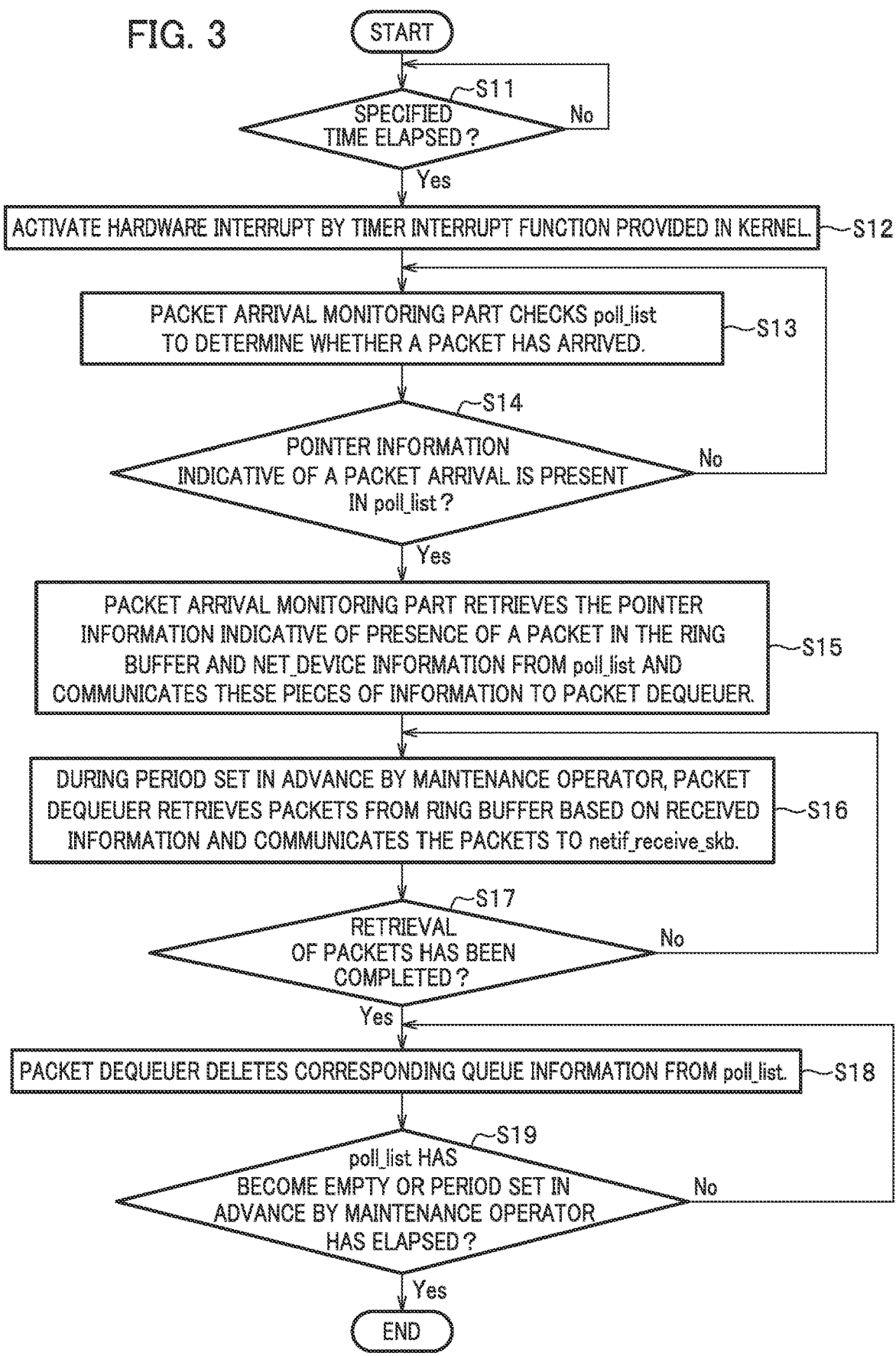
FIG. 3 is a flowchart illustrating an Rx-side operation of a server delay control device of the server delay control system according to the first embodiment of the present invention.

FIG. 3 is a flowchart of the relief processing by the timer interrupt of server delay control device 100 (see FIG. 2) of the present embodiment. Hereinafter, the Rx-side operations will be described with reference to FIG. 2.

When the specified time elapses in timer 12 in step S11 (see reference sign s in FIG. 2), a hardware interrupt is generated by the timer interrupt function provided in the kernel 171 (see FIG. 1) in step S12 (see reference sign t in FIG. 2).

In step S13, packet arrival monitoring part 110 (see FIG. 2) checks poll list 186 (see FIG. 2) (see reference sign p in FIG. 2) to determine whether a packet has arrived.

In step S14, packet arrival monitoring part 110 determines whether pointer information indicative of a packet arrival is present in poll_list 186. If pointer information is absent (S14: No), the process returns to step S13, and if pointer information is present (S14: Yes), the process proceeds to step S15.

In step S15, the packet arrival monitoring part 110 retrieves, from poll list 186, the pointer information indicative of the presence of the packet stored in ring buffer 72 (see FIG. 2) and NET_DEVICE information and communicates the corresponding pointer information and NET_DEVICE information to packet dequeuer 120 (see FIG. 2) (see reference sign q in FIG. 2). Here, if multiple pieces of packet information are present in poll list 186, packet arrival monitoring part 110 communicates information as many as the multiple pieces.

In step S16, during the period set in advance by a maintenance operator, packet dequeuer 120 retrieves packet(s) from ring buffer 72 based on the received information (see reference sign r in FIG. 2) and communicates the packet(s) to netif_receive_skb 87 (see reference sign u in FIG. 2).

In step S17, packet dequeuer 120 determines whether the retrieval of the packets has been completed.

When the retrieval of the packets has not been completed (step S17: No), the processing returns to step S16.

When the retrieval of the packets has been completed (step S17: Yes), packet dequeuer 120 deletes the corresponding queue information from poll_list 186 in step S18.

In step S19, server delay control device 100 (see FIG. 2) determines whether the poll list 186 has become empty or a period set in advance by a maintenance operator has elapsed.

When poll list 186 has become empty or the period set in advance by the maintenance operator has not elapsed (S19: No), the process returns to step S18.

When poll_list 186 has become empty or the period set in advance by the maintenance operator has elapsed (S19: Yes), the processing of this flow ends.

Difference Between Present Embodiment and Existing Technique

Next, a description will be given of differences between the present embodiment and the existing technique (see FIG. 12).

Background

Generally, it is required that a hardware interrupt (hardIRQ) have high priority and the processing of the corresponding CPU be interrupted to process the processing of hardIRQ with the highest priority. For this reason, the overhead is large. In view of this, general design concept for hardIRQ and softIRQ is such that hardIRQ only issues a notification of a packet arrival and a softIRQ processes the packet (this design concept is called "principle of kernel"). Here, there can be an event such that the softIRQ contends with other softIRQs and is put in a wait state. This event is a cause for the occurrence of a delay.

The reason that the conventional technique uses the interrupt model is that conventional technique is based on the design concept such that one CPU core is shared with other processing because the CPU resources are limited in the past (or because the processing is to be performed even in a device with fewer CPU cores as a single board computer like Raspberry Pi). In this case, processing is performed while switching the CPU time in normal processing, interrupt processing, and the like. Even in the above-described interrupt processing, softIRQs contend with one another and thus a wait time occurs.

Further, ksoftirqd, which is a scheduler that schedules softIRQs, does not have a function of imparting a priority according to the type of each softIRQ, and the occurrence of a delay caused by the contention cannot be suppressed.

Existing Technique (see FIG. 12)

As illustrated in FIG. 12, kernel 71 (FIG. 11) receives a notification of a packet arrival from NIC 11 via a hardIRQ (see reference sign h in FIG. 12) and schedules a softIRQ for packet processing (see the dashed box in FIG. 12). At this time, a wait occurs when contention with another interrupt processing occurs, and thus an NW delay in the order of milliseconds occurs.

Server Delay Control System 1000 (see FIG. 2)

As illustrated in FIG. 2, in the case of server delay control system 1000, although netif_rx 182 registers net_device in poll list 186 in the networking layer, netif_rx 182 does not perform scheduling of software interrupts (softIRQs) ("modification point 1"), unlike netif_rx 82 in the existing technique (see FIG. 12).

As illustrated in FIG. 2, in the device driver, timer 12 clocks the specified time using hw_clock 12a and raises the hardware interrupt (hardIRQ) to hardIRQ 91 (handler) (see reference sign s in FIG. 2) ("modification 2").

As illustrated in FIG. 2, server delay control system 1000 provides server delay control device 100, in a server memory space, in the networking layer ("modification point 3").

Packet arrival monitoring part 110 of server delay control device 100 checks the presence or absence of a packet in poll list 186 (see reference sign p in FIG. 2) upon being triggered by the timer interrupt (see reference sign t in FIG. 2).

When a packet has arrived (see reference sign q in FIG. 2), packet dequeuer 120 of server delay control device 100 dequeues the packet from ring buffer 72 (see reference sign r in FIG. 2).

Packet dequeuer 120 retrieves the packet from ring buffer 72 according to the communicated information and communicates the packet to netif_receive_skb 87 (see reference sign u in FIG. 2).

Comparison between Existing Technique (see FIG. 12) and Server Delay Control System 1000 (see FIG. 2)

Low-Delay Packet Processing

Checking the packet arrival upon being triggered by a timer interrupt (hardware interrupt) makes it possible to perform packet transfer processing at least within the timer interval, and thus guarantee the delay time. That is, as the packet dequeueing processing is performed in the context of the hardware interrupt, the problem of software interrupt contention does not occur.

Modification of APL is not Required

This embodiment follows NAPI regarding the notification of a packet arrival using a hardware interrupt (hardIRQ). Although softIRQs are convenient in that they effectively utilize CPU resources, they are not suitable in terms of immediate packet transfer. In view of this, this embodiment is novel in that the embodiment halts the function of the softIRQs and implements the polling model in the kernel. Specifically, this is reflected in that netif_rx 182, illustrated in FIG. 2, does not issue a notification for raising softIRQ 83 (handler) (see reference sign h in FIG. 12) unlike netif_rx 82, illustrated in FIG. 12.

Figure 10:
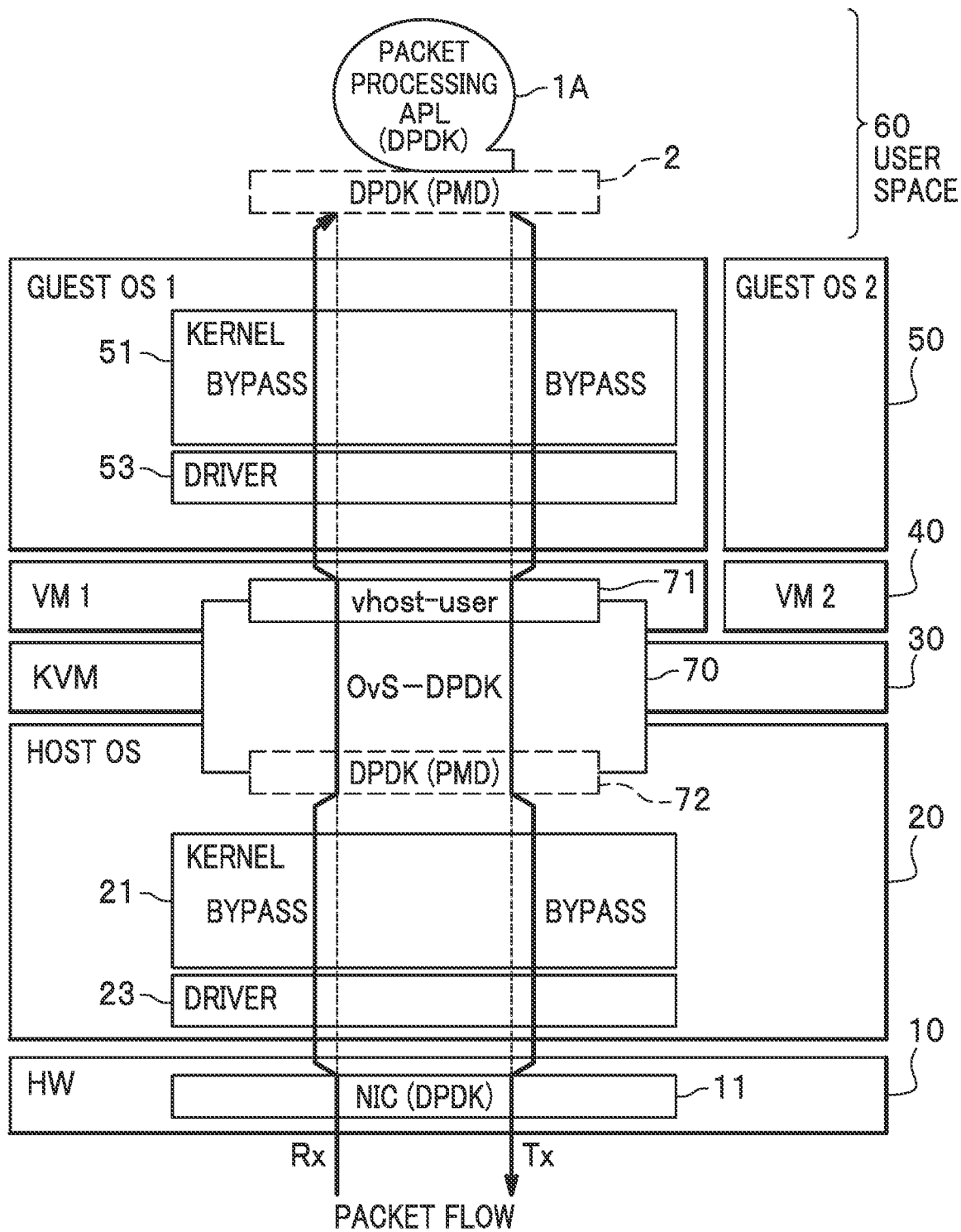
FIG. 10 is an explanatory diagram illustrating packet transfer based on a polling model in an OvS-DPDK configuration.

Note that, with respect to the polling model, DPDK, which performs polling from a user space, is known as an existing technique (see FIG. 10). However, DPDK requires modification of the APL because the polling is to be performed from the APL.

In the present embodiment, a thread (packet arrival monitoring part 110 of server delay control device 100) dedicated to polling is started in kernel 171 illustrated in FIG. 1, and packet dequeuer 120 of server delay control device 100 performs packet processing according to the polling model (no softIRQ) at the time of packet arrival. As the present embodiment is an embodiment method with which POSIX socket API, which is used by developers of APL to be operated on Linux, can be used, it is not necessary to modify the APL. In other words, it is possible to use the existing POSIX socket API.

Re-Development is not Required for Each Kernel Security Update

The present embodiment makes it possible to enable the present invention by a livepatch with which the processing can be changed while running the kernel in a state of having been started. Therefore, it is not necessary to re-develop the software every time the security update of the kernel is to be performed. That is, redevelopment is to be performed only when there is a change in the related kernel functions.

Others

In this embodiment, unlike NAPI of the existing technique, no software interrupt contention occurs because packet processing is performed in the hardware interrupt context triggered by the timer interrupt.

In this embodiment, unlike DPDK of the existing technique, no modification is necessary for APL because the packet processing is completed in the kernel.

Distinctive Effect of Providing Server Delay Control Device 100 in Networking Layer Server delay control device 100 halts the softIRQ being a main delay cause, and, upon being triggered by the timer, performs packet processing in the context of the hardIRQ having high priority. With this, softIRQ contention is avoided.

Server delay control device 100 operates, upon being triggered by the timer, in short time slices, to avoid the packet processing by the hardIRQ having high priority from occupying the CPU time and thus causing the system operation to become unstable. With this, the CPU time required for the system operation is secured and stable operations are achieved.

Upon being triggered by the timer interrupt (hardware interrupt), server delay control device 100 checks the arrivals of packets in the context of the hardware interrupt and performs packet dequeueing processing at the arrivals of the packets. With this, server delay control device 100 avoids the contention of the software interrupt being a cause of a delay in the order of milliseconds and thus achieves packet processing with a low delay (the hardware interrupt won't be disturbed by other processing as the hardware interrupt has the highest priority).

Second Embodiment

A server delay control system 1000A according to a second embodiment of the present invention has a structure which is schematically the same as that of server delay control system 1000 illustrated in FIG. 1.

Figure 4:
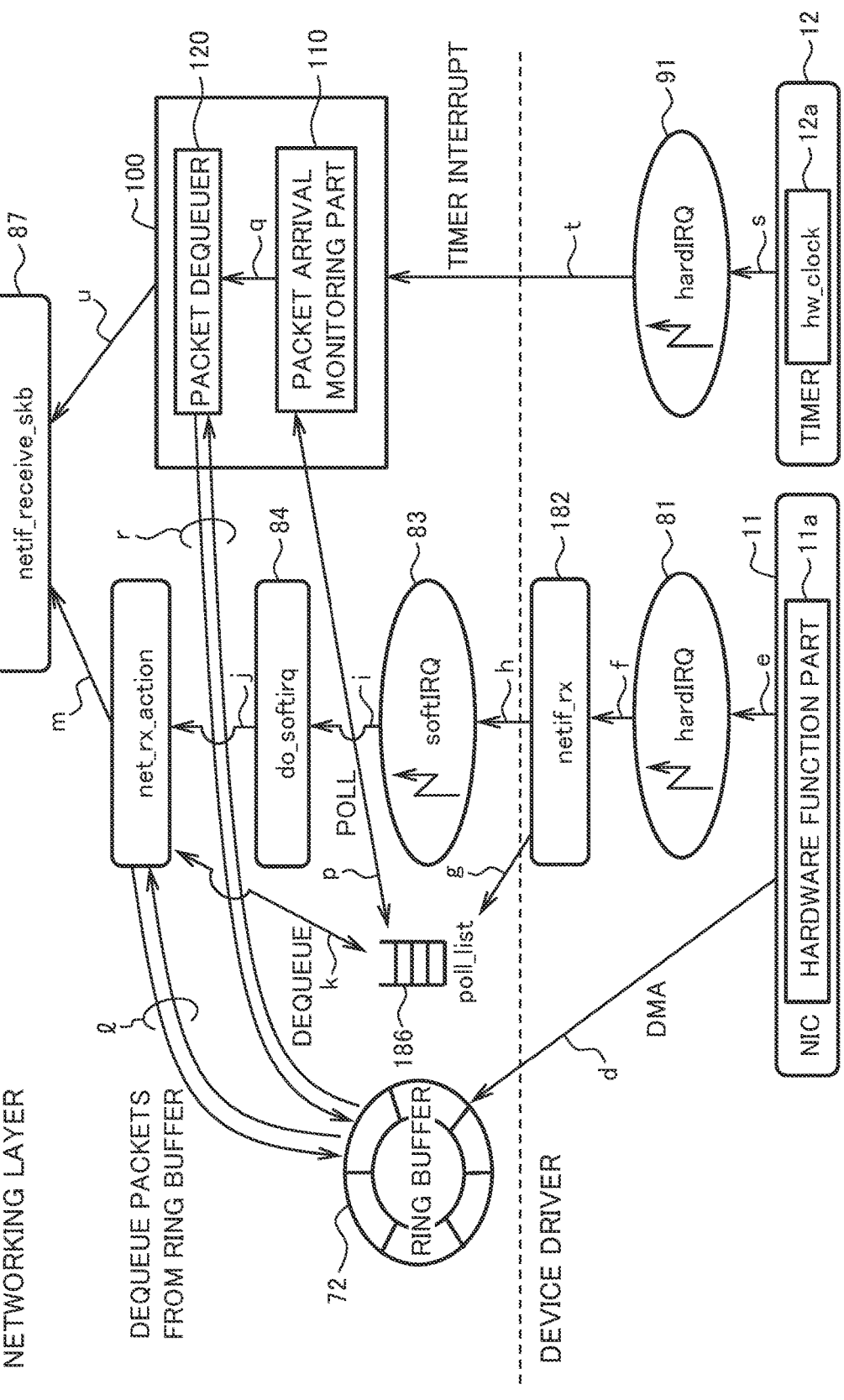
FIG. 4 is an explanatory diagram illustrating details of packet processing of a server delay control system according to a second embodiment of the present invention.

FIG. 4 is an explanatory diagram illustrating details of packet processing of the server delay control system 1000A according to the second embodiment of the present invention. The same components as those in FIGS. 2 and 12 are denoted by the same reference signs thereas, and descriptions of overlapping portions are omitted.

Server delay control system 1000A according to the second embodiment is a hybrid system of NAPI and server delay control system 1000 using the timer interrupt.

In order to relieve the delay (packet dequeueing delay) in the software interrupt contention of conventional NAPI, server delay control system 1000A utilizes the packet reception processing by conventional NAPI as is (see reference signs corresponding to FIG. 12) and performs packet reception processing by a timer interrupt (see reference signs corresponding to FIG. 2) in a manner of being superimposed on NAPI.

With this, the delay in the packet dequeueing by NAPI can be relieved by packet reception processing by timer interrupt. As a result, reduction of the delay of the packet reception processing can be achieved.

Next, a description will be given of the operation of server delay control system 1000A.

In server delay control system 1000A, conventional NAPI includes the processing to be performed by NAPI, illustrated in FIG. 4. Note that the "processing by NAPI" illustrated in FIG. 5 and the "relief processing by timer interrupt" illustrated in FIG. 3 operate independently of each other. Therefore, a management function part for performing timing control on the two is not required. The fact that they operate independently has been confirmed by implementation.

Figure 5:
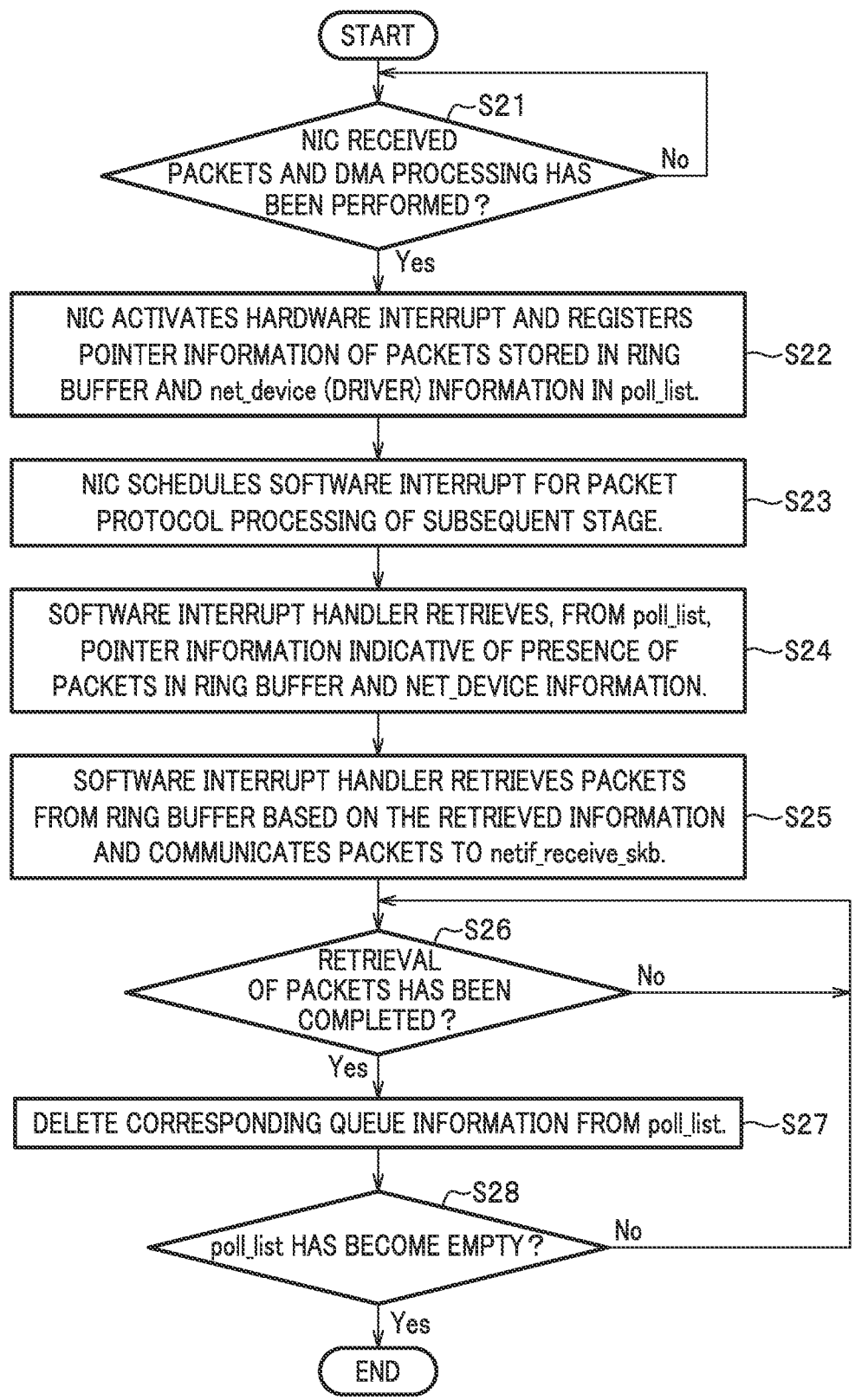
FIG. 5 is a flowchart illustrating processing by NAPI of the server delay control system according to the second embodiment of the present invention.

FIG. 5 is a flowchart illustrating processing by NAPI of server delay control system 1000A (see FIG. 4) according to the second embodiment. A description will be given taking the Rx-side operation as an example with reference to FIG. 4.

In step S21, NIC 11 receives a packet(s) and determines whether DMA processing has been performed.

When NIC 11 has received a packet(s) and DMA processing has been performed (S21: Yes), in step S22, NIC 11 generates a hardware interrupt and registers pointer information of the packet(s) stored in ring buffer 72 and NET_DEVICE (driver) information in poll list 186.

In step S23, the NIC 11 schedules a software interrupt for the packet protocol processing arranged in the subsequent stage.

In step S24, the software interrupt handler retrieves, from poll list 186, the pointer information indicative of the presence of the packet(s) in the ring_buffer 72 and the NET_DEVICE information.

In step S25, the software interrupt handler retrieves the packet(s) from ring buffer 72 based on the retrieved information and communicates the packet(s) to netif_receive_skb 87.

In step S26, determination is made as to whether the retrieval of the packet(s) has been completed. When the retrieval of the packet(s) has not been completed (S26: No), the processing returns to step S26.

When the retrieval of the packet(s) has been completed (S26: Yes), the corresponding queue information is deleted from poll list 186 in step S27.

In step S28, determination is made as to whether poll_list 186 has become empty. When poll_list 186 has not become empty (S28: No), the processing returns to step S26.

When poll_list 186 has become empty (S28: Yes), the processing of this flow is finished. The processing of this flow is repeatedly performed until poll_list 186 becomes empty.

The server delay control system 1000A of the present embodiment relieves a case where checking of the arrival of a packet based on poll_list 186 is delayed due to software interrupt contention or the like of the existing technique (e.g., NAPI). That is, upon being triggered by the timer interrupt, by the "relief processing by timer interrupt" illustrated in FIG. 3, packet arrival monitoring part 110 periodically checks the retrieval failures and relieves the retrieval failures. With this, the low-delay property is secured.

A supplemental description will be given of the relief processing by timer interrupt.

As relief for cases where checking of the packet arrival based on poll_list 186 is delayed, upon being triggered by the timer interrupt, the present embodiment periodically checks retrieval failures by the "relief processing by timer interrupt" illustrated in FIG. 3, thereby to relieve the retrieval failures.

Specifically, packet arrival monitoring part 110 checks the poll_list 186 to determine presence or absence of a packet(s), thereby to detect the failure of NAPI in performing dequeueing processing. There could be cases where even when there is no particular delay of NAPI, depending on the timing, the packet is dequeued from poll_list 186 by the "relief processing by timer interrupt" illustrated in FIG. 3.

The "processing by NAPI" illustrated in FIG. 5 and the "relief processing by timer interrupt" illustrated in FIG. 3 operate independently. Therefore, it is not necessary to notify the "relief processing by timer interrupt" illustrated in FIG. 3 that software interrupt contention of NAPI has occurred. As an outcome when NAPI is delayed is that a packet remains in the poll list 186, the "relief processing by timer interrupt" illustrated in FIG. 3 is able to perform the relief only by periodically being started and checking poll_list 186. The end condition is such that the "processing by NAPI" illustrated in FIG. 5 and the "relief processing by timer interrupt" illustrated in FIG. 3 operate independently and repeat processing until poll_list 186 becomes empty. Therefore, mutual dependence (control) is unnecessary.

Hardware Configuration

Figure 6:
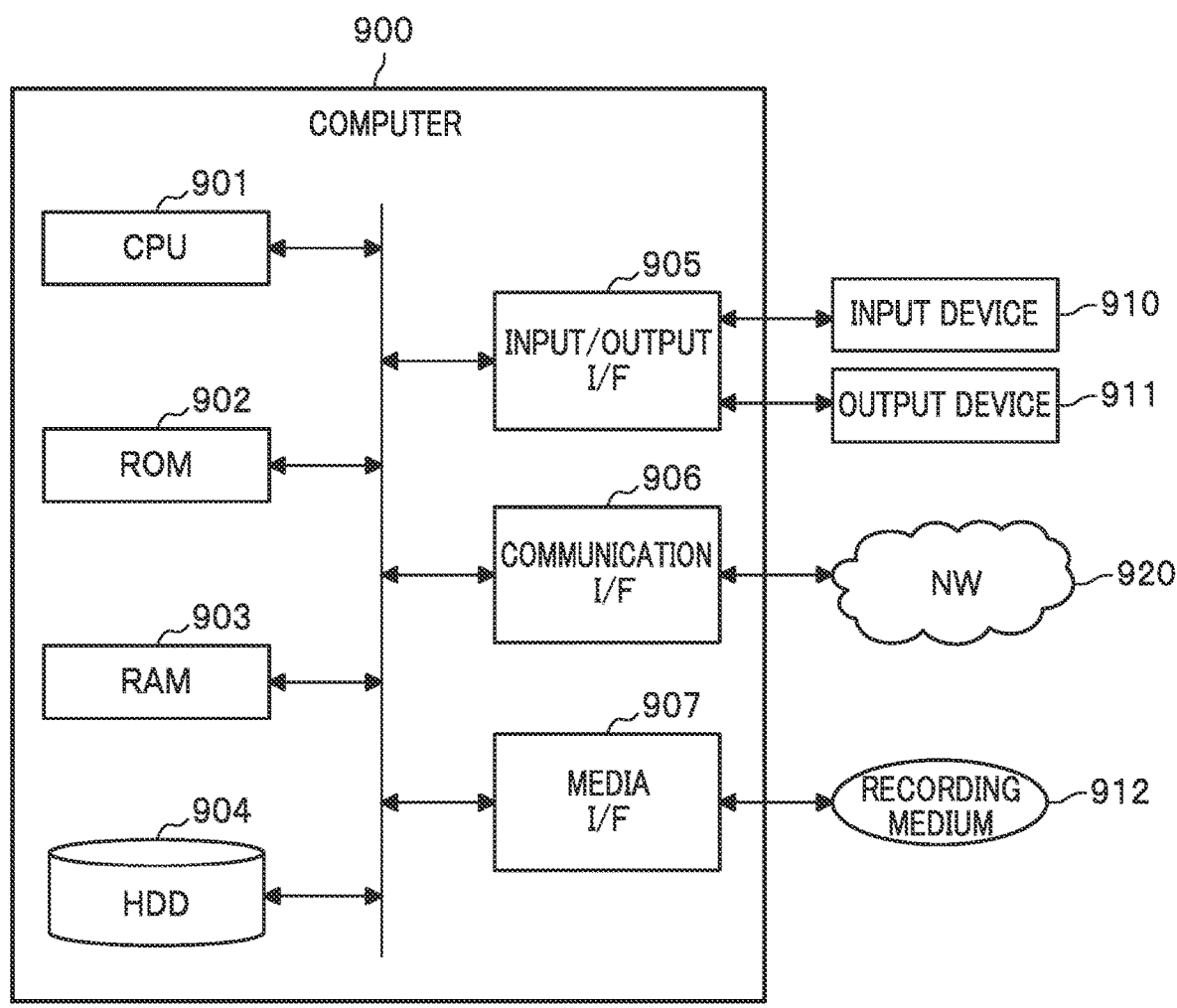
FIG. 6 is a hardware configuration diagram illustrating an example of a computer for realizing the functions of the server delay control device of the server delay control system according to each embodiment of the present invention.

The server delay control device 100 according to the present embodiment is embodied by, for example, a computer 900 having a configuration such as illustrated in FIG. 6.

FIG. 6 is a hardware configuration diagram illustrating an example of computer 900 that embodies the functions of server delay control device 100.

Computer 900 has a CPU 901, a RAM 902, a ROM 903, an HDD 904, a communication interface (I/F: Interface) 906, an input/output interface (I/F) 905, and a media interface (I/F) 907.

CPU 901 operates according to a program stored in ROM 902 or HDD 904, and controls components of server delay control device 100 illustrated in FIG. 1. ROM 902 stores a boot program to be executed by CPU 901 when computer 900 starts up, a program that relies on the hardware of computer 900, and the like.

CPU 901 controls an input device 910 such as a mouse and a keyboard and an output device 911 such as a display via an input/output I/F 905. CPU 901 acquires data from an input device 910 via input/output I/F 905, and outputs generated data to output device 911. A GPU (Graphics Processing Unit) or the like may be used together with CPU 901 as a processor.

HDD 904 stores programs to be executed by CPU 901, data to be used by the programs, and the like. Communication interface 906 receives data from another device via a communication network (e.g., network (NW) 920), sends the received data to CPU 901, and transmits data generated by CPU 901 to another device via the communication network.

Media I/F 907 reads a program or data stored in a recording medium 912 and provides the read program or data to CPU 901 via RAM 903. The CPU 901 loads a program related to target processing from the recording medium 912 onto RAM 903 via media I/F 907 and executes the loaded program. Recording medium 912 is an optical recording medium such as a digital versatile disc (DVD) or a phase change rewritable disk (PD), a magneto-optical recording medium such as a magneto-optical disk (MO), a magnetic recording medium, a conductor memory tape medium, a semiconductor memory, or the like.

For example, when computer 900 functions as server delay control device 100 configured as one device according to the present embodiment, CPU 901 of computer 900 embodies the functions of server delay control device 100 by executing the program loaded on RAM 903. Data in RAM 903 are stored in HDD 904. CPU 901 reads a program related to target processing from recording medium 912 and executes it. In addition, CPU 901 may read a program related to target processing from another device via a communication network (NW 920).

Application Example

Server delay control device 100 is to be a server delay control device that spawns in the kernel a thread that monitors packet arrivals according to the polling model. There is no limitation to the OS. Also, there is no limitation to being in a server virtualization environment. Accordingly, server delay control system 1000 can be applied to each of the configurations illustrated in FIGS. 7 and 8.

Example of Application to VM Configuration

Figure 7:
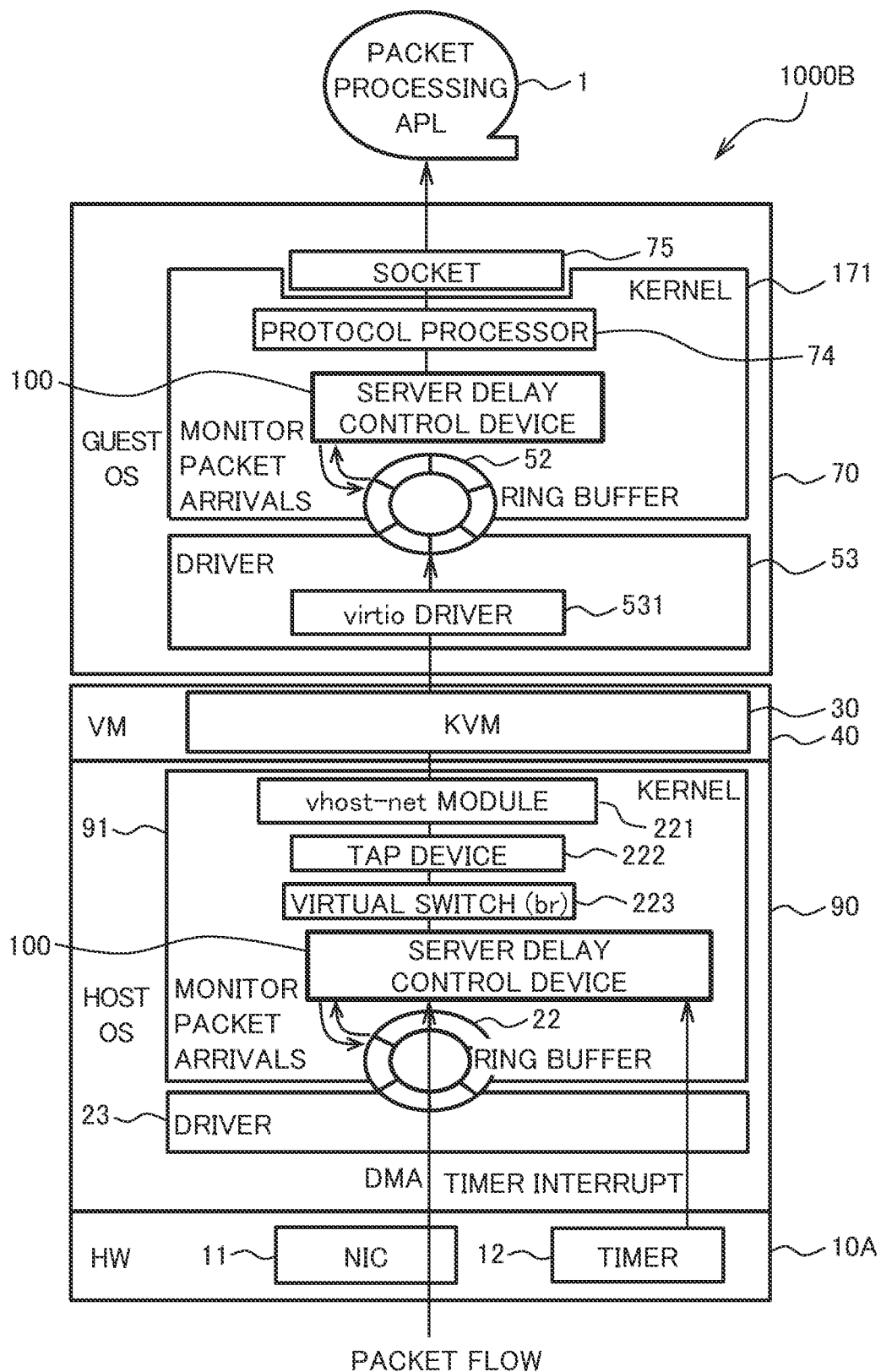
FIG. 7 is a diagram illustrating an example in which the server delay control system is applied to an interrupt model in a server virtualization environment which is configured with a general-purpose Linux kernel and a VM.
Figure 9:
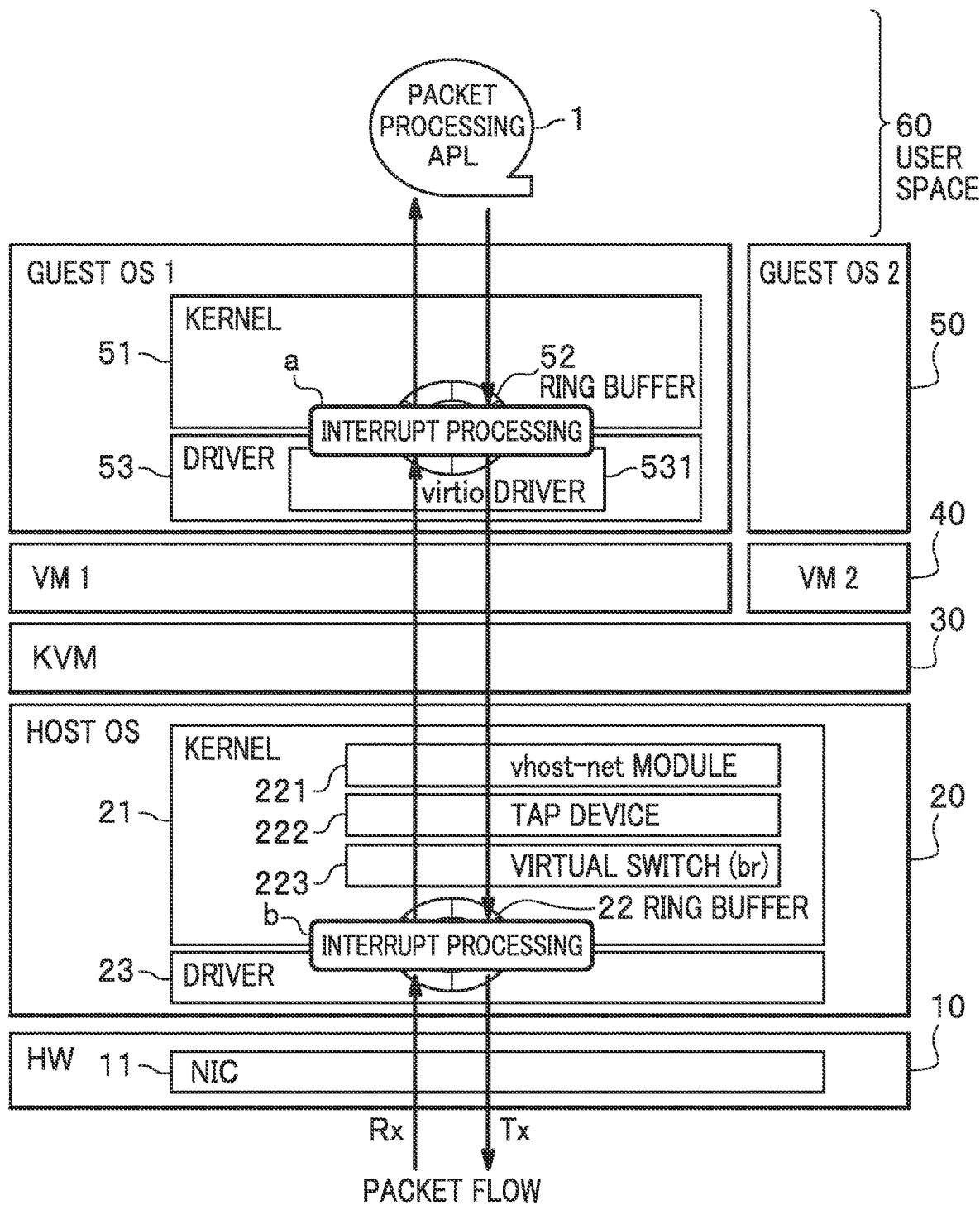
FIG. 9 is an explanatory diagram illustrating packet transfer operations performed according to an interrupt model in a server virtualization environment which is configured with a general-purpose Linux kernel and a VM.

FIG. 7 is a diagram illustrating an example in which a server delay control system 1000B is applied to the interrupt model in a server virtualization environment which is configured with a general-purpose Linux kernel (registered trade name) and a VM. The same components as those in FIGS. 1 and 9 are denoted by the same reference signs thereas.

As illustrated in FIG. 7, server delay control system 1000B is such that a server delay control device 100 is deployed in a kernel 171 of a Guest OS 70 and another server delay control device 100 is deployed in a kernel 91 of a Host OS 90.

In detail, the server includes: Host OS 90, on which a virtual machine and an external process formed outside the virtual machine can operate; and Guest OS 70, which operates in the virtual machine.

Host OS 90 includes: a kernel 91; a ring buffer 22 that is managed by kernel 91, in a memory space in which the server deploys host OS 90, and a poll list 186 (see FIG. 2), in which information on net device, indicative of which device the hardware interrupt (hardIRQ) from a NIC 11 comes from, is registered; a vhost-net module 221, which is a kernel thread; a TAP device 222, which is a virtual interface created by kernel 91; and a virtual switch (br) 223.

Kernel 91 includes: a packet arrival monitoring part 110 configured to monitor (busy-polls) poll_list 186 all the time; and a packet dequeuer 120 configured to, when a packet has arrived, reference the packet held in a ring buffer 72, and perform, on the basis of the processing to be performed next, dequeuing to remove the corresponding queue entry from ring buffer 72.

Kernel 91 transmits the packet to a VM 40 virtual machine 30 via TAP device 222.

On the other hand, Guest OS 70 includes: a kernel 171; a ring buffer 52 that is managed by kernel 171, in a memory space in which the server deploys Guest OS 70; a poll list 186 (see FIG. 2), in which information on net device, indicative of which device the hardware interrupt (hardIRQ) from NIC 11 comes from, is registered; a socket 75, which is an interface for kernel 171 to perform inter-process communication.

Kernel 171 includes: a packet arrival monitoring part 110 configured to monitor (busy-polls) a poll_list 186 all the time; and a packet dequeuer 120 configured to, when a packet has arrived, reference the packet held in a ring buffer 52, and perform, on the basis of the processing to be performed next, dequeuing to remove the corresponding queue entry from ring buffer 52; and a protocol processor 74 configured to perform protocol processing on the packet on which the dequeuing is performed.

Kernel 171 communicates the packet to a packet processing APL 1 via protocol processor 74.

In this way, in a system with a VM virtual server configuration, packet transfer can be performed with reduced delays in the server without modifying the APL in any OS of Host OS 90 and Guest OS 70.

Example of Application to Container Configuration

Figure 8:
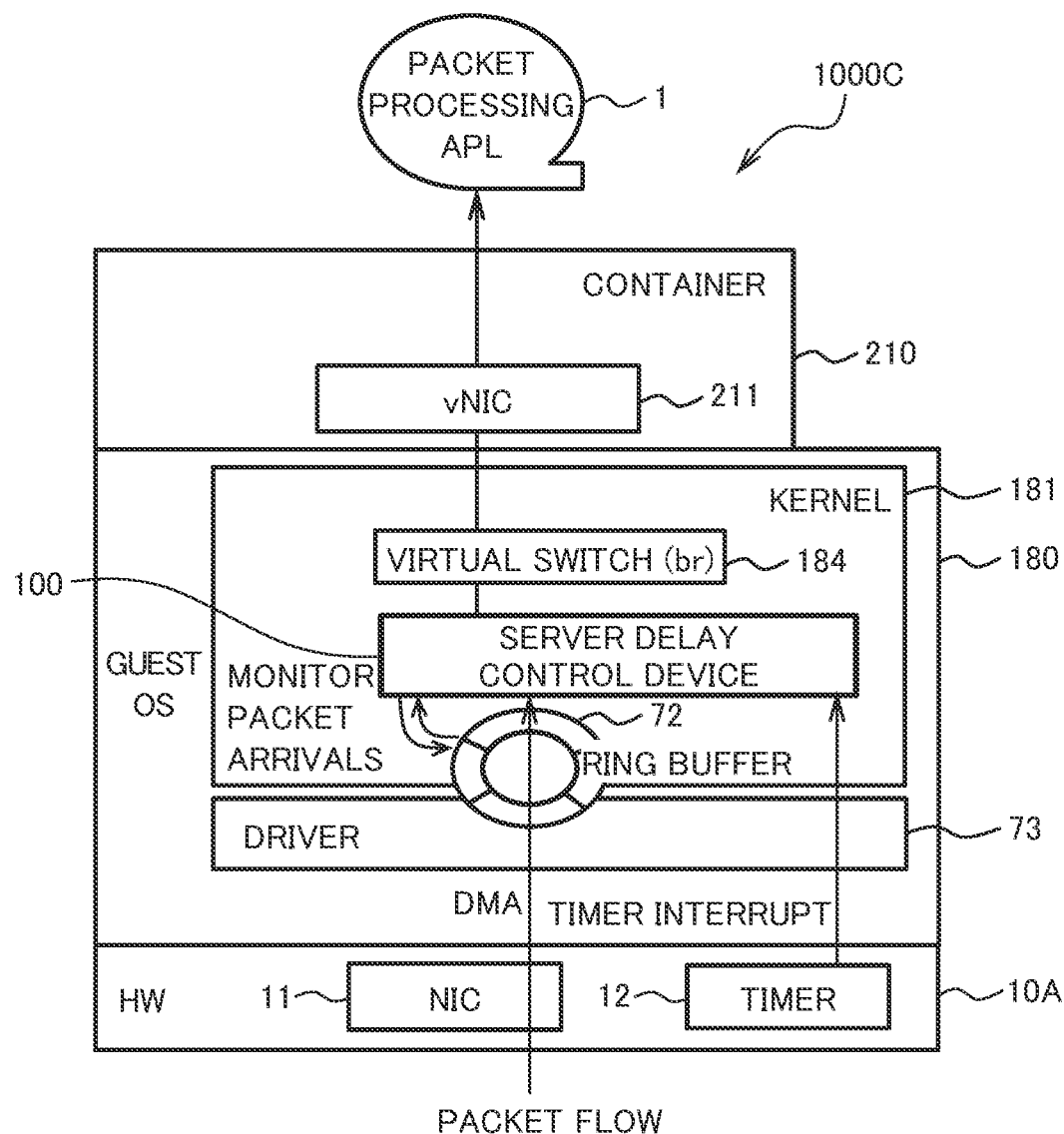
FIG. 8 is a diagram illustrating an example in which the server delay control system is applied to an interrupt model in a server virtualization environment having a container configuration.

FIG. 8 is a Diagram Illustrating an Example in which a Server Delay Control System 1000C is applied to an interrupt model in a server virtualization environment with a container configuration. The same components as those in FIG. 1 are denoted by the same reference signs thereas.

As illustrated in FIG. 8, server delay control system 1000C has a container configuration in which a Guest OS 180 and, in place of an OS, a Container 210 are deployed. Container 210 includes a vNIC (virtual NIC) 211. A server delay control device 100 is deployed in a kernel 181 of Guest OS 180.

In the system with the virtual server configuration, such as a container, packet transfer can be performed with a reduced delay in the server without modifying the APL.

Example of Application to Bare-Metal Configuration (Non-Virtualized Configuration)

The present invention can be applied to a system with a non-virtualized configuration, such as in a bare-metal configuration. In a non-virtualized configuration system, packet transfer can be performed with a reduced delay in a server without modifying an APL 3.

Extended Technique

The present invention makes it possible to scale out against a network load by increasing the number of CPUs allocated to a packet arrival monitoring thread in conjunction with receive-side scaling (RSS), which is capable of processing inbound network traffic with multiple CPUs when the number of traffic flows increases.

Effects

As described above, an OS (OS 70) includes: a kernel (kernel 171); a ring buffer (ring buffer 72) managed by the kernel, in a memory space in which a server deploys the OS; and a poll list (poll list 186), in which information on net device, indicative of which device a hardware interrupt (hardIRQ) from an interface part (NIC 11) comes from, is registered. The kernel includes a server delay control device (server delay control device 100) configured to receive a timer interrupt at predetermined specified intervals and spawn a thread configured to monitor packet arrivals according to a polling model. The server delay control device includes: a packet arrival monitoring part (packet arrival monitoring part 110) configured to configure a timer interrupt as a hardware interrupt and check the presence or absence of a packet in the poll list upon being triggered by the timer interrupt to monitor (poll) the poll list; and a packet dequeuer (packet dequeuer 120) configured to, when a packet has arrived, reference the packet held in the ring buffer, and perform, on the basis of the processing to be performed next, dequeuing to remove the corresponding queue entry from the ring buffer.

In this way, server delay control device 100 halts the software interrupts (softIRQs) that perform packet processing, which is the main cause of the occurrence of the NW delay, packet arrival monitoring part 110 of server delay control device 100 checks an arrival of a packet in the context of the hardware interrupt upon being triggered by the timer interrupt (hardware interrupt), and packet dequeuer 120 performs packet processing according to the polling model (no softIRQ) at the time of packet arrival. This brings about the following effects (1) to (4).

(1) Software interrupts (softIRQs) at the arrivals of packets, which are the cause of the occurrence of a delay, are halted, and instead, upon being triggered by the timer, packet processing is performed in the context of a hardIRQ having high priority, thereby avoiding softIRQ contention. That is, the server delay control system 1000 checks a packet arrival(s) upon being triggered by a timer interrupt (hardware interrupt). This makes it possible to perform packet transfer processing at least within the timer interval and thus guarantee the delay time (as the packet dequeueing processing is performed in the context of the hardware interrupt, the problem of software interrupt contention does not occur). As the packet(s) are immediately dequeued without a wait at the time of the packet arrivals, low-delay packet processing can be achieved.

(2) There is no need of having an APL equipped with a function for high-speed packet transfer, and the APL is simply to interwork with the existing POSIX socket API of the kernel (kernel 171). That is, unlike DPDK of the existing technique, server delay control system 1000 does not require the APL to be modified because the polling model is embodied in the kernel (because, unlike DPDK of the existing technique, the packet processing is completed in the kernel). Specifically, there is no need of implementing the function for high-speed packet transfer (see dpdk (PMD) 2 in FIG. 10) in packet processing APL 1A (see FIG. 10) as illustrated in FIG. 10. Packet processing APL 1 (see FIG. 1) of server delay control system 1000 is simply to interwork with the existing POSIX socket API in the kernel. Therefore, the implementation is possible without modifying the APL. For example, as it is possible to use POSIX socket API, which is used by developers of APLs to be operated on Linux, the present invention can be used without modifying the APLs.

(3) Re-development at every kernel security update is not necessary

In addition, it is possible to enable a patch by applying a livepatch with which the processing operations can be changed while running the kernel in a state of having been started. Therefore, there is no need of re-developing the software at every security update of the kernel (software is to be re-developed only when there is a change in the related kernel functions).

(4) Unlike NAPI of the existing technique, as the packet processing is performed in the hardware interrupt context triggered by the timer interrupt, software interrupt contention does not occur.

Moreover, a Guest OS (Guest OS 70) configured to operate in a virtual machine includes: a kernel (kernel 171); a ring buffer (ring buffer 72) managed by the kernel, in a memory space in which the server deploys the guest OS; a poll list (poll list 186), in which information on a net device, indicative of which device a hardware interrupt (hardIRQ) from an interface part (NIC 11) comes from, is registered; and a protocol processor (protocol processor 74) configured to perform protocol processing on a packet on which dequeuing has been performed. The kernel includes a server delay control device (server delay control device 100) configured to receive a timer interrupt at predetermined specified intervals and spawn a thread configured to monitor a packet arrival according to a polling model. The server delay control device includes: a packet arrival monitoring part (packet arrival monitoring part 110) configured to configure the timer interrupt as a hardware interrupt and check the presence or absence of a packet in the poll list upon being triggered by the timer interrupt to monitor (poll) the poll list; and a packet dequeuer (packet dequeuer 120) configured to, when a packet has arrived, reference the packet held in the ring buffer, and perform, on the basis of the processing to be performed next, dequeuing to remove the corresponding queue entry from the ring buffer.

In this way, in a system of a VM-based virtual server configuration, it is possible to achieve low-delay packet processing for a server including a guest OS (guest OS 70), and it is possible to perform packet transfer with a reduced delay in the server without modifying the APL.

Moreover, a Host OS (Host OS 90) on which a virtual machine and an external process formed outside the virtual machine can operate includes: a kernel (kernel 91); a ring buffer (ring buffer 22) managed by the kernel, in a memory space in which the server deploys the Host OS; a poll list (poll list 186) in which information on net device, indicative of which device a hardware interrupt (hardIRQ) from an interface part (NIC 11) comes from, is registered; and a TAP device (TAP device 222), which is a virtual interface created by the kernel (kernel 91). The kernel includes a server delay control device (server delay control device 100) configured to receive a timer interrupt at predetermined specified intervals and spawn a thread configured to monitor packet arrivals according to a polling model. The server delay control device includes: a packet arrival monitoring part (packet arrival monitoring part 110) configured to configure a timer interrupt as a hardware interrupt and monitor (poll) the poll list to check the presence or absence of a packet in the poll list upon being triggered by the timer interrupt; and a packet dequeuer (packet dequeuer 120) configured to, when a packet has arrived, reference the packet held in the ring buffer (ring buffer 72), and perform, on the basis of the processing to be performed next, dequeuing to remove the corresponding queue entry from the ring buffer.

In this way, in a system of a VM-based virtual server configuration, it is possible to achieve low-delay packet processing for a server including a kernel (kernel 91) and a host OS (host OS 90), and it is possible to perform packet transfer with a reduced delay in the server without modifying the APL.

In the server delay control device 100, the interface part halts software interrupt-based scheduling when a hardware interrupt is raised to an interrupt handler (hardIRQ 81) and a device is registered in the poll list.

In this way, it is possible to halt the softIRQ being a main delay cause, and instead, upon being triggered by the timer, perform packet processing in the context of the hardIRQ having high priority, thereby to avoid the softIRQ contention.

In the server delay control device 100, the predetermined specified interval is a time interval such that the packet processing by the hardware interrupt does not occupy a CPU time required for the system operation and does not occupy a predetermined time duration (set by an operator; e.g., 1 μs) or more.

In this way, it is possible to avoid the packet processing by the hardIRQ having high priority from occupying the CPU time and thus causing the system operation to become unstable. Further, by causing the operation to be performed in short time slices upon being triggered by the timer, the CPU time required for the system operation can be secured, so that a stable operation can be achieved.

In server delay control device 100, the kernel (kernel 171) may include a patch (Livepatch) that is capable of changing the processing operations while running the kernel in a state of having been started.

With this configuration, there is no need of modifying the kernel (kernel 171) because the processing operation of the kernel can be changed using Livepatch. Therefore, there is no need of re-developing the kernel, for example, at every security update of the kernel. The processing operations need to be modified only when there is a change in the related kernel functions.

Note that among the processes described in the above embodiments, all or some of the processes described as being automatically performed can also be manually performed, or all or some of the processes described as being manually performed can also be performed automatically using a known method. Also, the processing procedure, the control procedure, specific names, and information including various types of data and parameters, which have been described in the above-presented description and drawings can be changed as appropriate unless otherwise specified.

Also, each constituent element of the illustrated devices is a functional concept, and does not necessarily need to be physically configured as illustrated in the drawings. That is, the specific forms of the distribution and integration of the devices are not limited to those illustrated in the drawings, and all or some of the specific forms can be functionally or physically distributed or integrated in any unit according to various types of loads, usage conditions, and the like.

Also, the above configurations, functions, processing parts, processing means, and the like may be embodied by hardware by designing a part or all of them with, for example, an integrated circuit, or the like. Also, each of the above configurations, functions, and the like may be embodied by software for the processor to interpret and execute a program for realizing each function. Information such as programs, tables, and files that embody each function can be stored in a memory, a recording device such as a hard disk, or an SSD (Solid State Drive), or a recording medium such as an IC (Integrated Circuit) card, an SD (Secure Digital) card, or an optical disk.

REFERENCE SIGNS LIST

1 Packet processing APL (application)
10, 10A HW
11 NIC (physical NIC) (interface part)
12 Timer
60 User space
70 OS
72 Ring buffer
74 Protocol processor
81 HardIRQ (interrupt handler)
90 Host OS (OS)
91, 171, 181 Kernel
100 Server delay control device
110 Packet arrival monitoring part
120 Packet dequeuer
180 Guest OS (OS)
186 Poll_list (poll list)
210 Container
1000, 1000A, 1000B, 1000C Server delay control system

The invention claimed is:

1. A server delay control device for performing, on a server, packet transfer from an interface part of a computer comprising one or more hardware processors, the server comprising an OS and implemented using one or more of the one or more hardware processors, the OS comprising: a kernel in which the server delay control device is deployed; a ring buffer managed by the kernel, in a memory space in which the server deploys the OS; and a poll list in which information on a net device is registered, the information on the net device being indicative of which device a hardware interrupt from an interface part comes from, the server delay control device implemented using one or more of the one or more hardware processors, configured to receive a timer interrupt at predetermined specified intervals, and comprising:
    a packet arrival monitoring part configured to configure the timer interrupt as a hardware interrupt and check the presence or absence of a packet in the poll list upon being triggered by the timer interrupt to monitor the poll list; and
    a packet dequeuer configured to, when a packet has arrived, reference the packet held in the ring buffer, and perform dequeuing to remove a corresponding queue entry from the ring buffer.

2. The server delay control device according to claim 1, wherein the server comprises a virtual machine and the OS is a Guest OS configured to operate in the virtual machine.

3. The server delay control device according to claim 1, wherein the OS is a Host OS on which a virtual machine and an external process formed outside the virtual machine can operate.

4. The server delay control device according to claim 1, wherein the interface part is configured to raise a hardware interrupt to an interrupt handler and register a device in the poll list without scheduling a software interrupt.

5. The server delay control device according to claim 2, wherein the interface part is configured to raise a hardware interrupt to an interrupt handler and register a device in the poll list without scheduling a software interrupt.

6. The server delay control device according to claim 3, wherein the interface part is configured to raise a hardware interrupt to an interrupt handler and register a device in the poll list without scheduling a software interrupt.

7. The server delay control device according to claim 1, wherein the packet dequeuer is configured to, in a context of the timer interrupt, when at least one packet including the packet has arrived, reference the at least one packet held in the ring buffer, and perform dequeuing to remove corresponding at least one queue entry from the ring buffer, during a period set in advance by a maintenance operator.

8. The server delay control device according to claim 2, wherein the packet dequeuer is configured to, in a context of the timer interrupt, when at least one packet including the packet has arrived, reference the at least one packet held in the ring buffer, and perform dequeuing to remove corresponding at least one queue entry from the ring buffer, during a period set in advance by a maintenance operator.

9. The server delay control device according to claim 3, wherein the packet dequeuer is configured to, in a context of the timer interrupt, when at least one packet including the packet has arrived, reference the at least one packet held in the ring buffer, and perform dequeuing to remove corresponding at least one queue entry from the ring buffer, during a period set in advance by a maintenance operator.

10. The server delay control device according to claim 1, wherein the kernel further comprises a patch that is capable of changing a processing operation of the kernel while running the kernel in a state of having been started.

11. The server delay control device according to claim 2, wherein the kernel further comprises a patch that is capable of changing a processing operation of the kernel while running the kernel in a state of having been started.

12. The server delay control device according to claim 3, wherein the kernel further comprises a patch that is capable of changing a processing operation of the kernel while running the kernel in a state of having been started.

13. A server delay control method of a server delay control device for performing, on a server, packet transfer from an interface part of a computer comprising one or more hardware processors, the server comprising an OS and implemented using one or more of the one or more hardware processors, the OS comprising: a kernel in which the server delay control device is deployed; a ring buffer managed by the kernel, in a memory space in which the server deploys the OS; and a poll list in which information on a net device is registered, the information on the net device being indicative of which device a hardware interrupt from an interface part comes from, the server delay control device implemented using one or more of the one or more hardware processors and configured to receive a timer interrupt at predetermined specified intervals, the server delay control method comprising steps of:

configuring, by the server delay control device, the timer interrupt as a hardware interrupt and checking, by the server delay control device, the presence or absence of a packet in the poll list upon being triggered by the timer interrupt to monitor the poll list; and when a packet has arrived, referencing, by the server delay control device, the packet held in the ring buffer, and performing, by the server delay control device, dequeuing to remove a corresponding queue entry from the ring buffer.

14. A non-transitory computer-readable medium storing a computer program for a server delay control device for performing, on a server, packet transfer from an interface part of a computer comprising one or more hardware processors, the server comprising an OS and implemented using one or more of the one or more hardware processors, the OS comprising: a kernel in which the server delay control device is deployed; a ring buffer managed by the kernel, in a memory space in which the server deploys the OS; and a poll list in which information on a net device is registered, the information on the net device being indicative of which device a hardware interrupt from an interface part comes from, the server delay control device implemented using one or more of the one or more hardware processors and configured to receive a timer interrupt at predetermined specified intervals, the computer program causing the server delay control device to execute steps comprising:

configuring, by the server delay control device, the timer interrupt as a hardware interrupt and checking, by the server delay control device, the presence or absence of a packet in the poll list upon being triggered by the timer interrupt to monitor the poll list; and when a packet has arrived, referencing, by the server delay control device, the packet held in the ring buffer, and performing, by the server delay control device, dequeuing to remove a corresponding queue entry from the ring buffer.

* * * * *